(12) United States Patent
Dabell et al.

(10) Patent No.: US 12,063,148 B2
(45) Date of Patent: Aug. 13, 2024

(54) ORCHESTRATING CONFIGURATION OF A PROGRAMMABLE ACCELERATOR

(71) Applicant: F5 Networks, Inc., Seattle, WA (US)

(72) Inventors: Steven Dabell, Spokane, WA (US); Timothy S. Michels, Greenacres, WA (US); Jagir Maya Rai, Spokane, WA (US)

(73) Assignee: F5, Inc., Seattle, WA (US)

( * ) Notice: Subject to any disclaimer, the term of this patent is extended or adjusted under 35 U.S.C. 154(b) by 0 days.

(21) Appl. No.: 16/904,934

(22) Filed: Jun. 18, 2020

(65) Prior Publication Data

US 2021/0399954 A1 Dec. 23, 2021

(51) Int. Cl.
*H04L 41/00* (2022.01)
*G06F 9/445* (2018.01)
*G06F 9/455* (2018.01)

(52) U.S. Cl.
CPC .......... *H04L 41/24* (2013.01); *G06F 9/44505* (2013.01); *G06F 9/45558* (2013.01); *G06F 2009/45595* (2013.01)

(58) Field of Classification Search
CPC .. G06F 13/1668; G06F 12/10; G06F 13/4282; G06F 2212/657; G06F 8/65; G06F 12/109; G06F 13/24; G06F 2213/2424; G06F 8/654; G06F 9/44505; G06F 9/45558; G06F 2009/45595; G06T 15/04; G06T 2207/10016; G03H 1/2294; H04L 67/42; H04L 41/24
See application file for complete search history.

(56) References Cited

U.S. PATENT DOCUMENTS 6,249,285 B1 * 6/2001 Madden ............... G06V 10/147
345/419
6,297,825 B1 * 10/2001 Madden ................... G06T 5/50
345/589

(Continued)

OTHER PUBLICATIONS

Anonymous: "Automating F5 Application Services: A Practical Guide Introduction", May 13, 2019 (May 13, 2019), Retrieved from the Internet: URL:https://www.f5.com/services/resources/white-papers/automating-f5-application-services--a-practical-guide- [retrieved on Nov. 17, 2021].

(Continued)

*Primary Examiner* — Ninos Donabed
(74) *Attorney, Agent, or Firm* — Troutman Pepper Hamilton Sanders LLP

(57) ABSTRACT

Technology related to orchestrating a configuration of a programmable accelerator is disclosed. In one example, a method includes executing a service within a container runtime. The service can include a software application and an orchestrator application, where the orchestrator application is adapted to configure a programmable hardware accelerator and the software application adapted to interoperate with the programmable hardware accelerator. The orchestrator application, executing within the container runtime, can be used to retrieve a system image from a file repository. The system image can include configuration data for the programmable hardware accelerator. The orchestrator application, executing within the container runtime, can be used to configure the programmable hardware accelerator.

16 Claims, 8 Drawing Sheets

(56) References Cited

U.S. PATENT DOCUMENTS

| | | | |
|---|---|---|---|
| 6,510,469 B1* | 1/2003 | Starnes | H04L 67/566 709/217 |
| 7,382,154 B2* | 6/2008 | Ramos | G06F 15/7867 326/38 |
| 7,953,014 B2* | 5/2011 | Toda | H04L 43/50 370/242 |
| 8,103,809 B1 | 1/2012 | Michels et al. | |
| 8,121,117 B1 | 2/2012 | Amdahl et al. | |
| 9,152,483 B2 | 10/2015 | Michels et al. | |
| 9,691,479 B1* | 6/2017 | Merced Grafals | G11C 13/004 |
| 9,800,568 B1 | 10/2017 | Moses et al. | |
| 9,819,542 B2* | 11/2017 | Burger | G06F 11/3003 |
| 10,091,138 B2 | 10/2018 | Szabo et al. | |
| 10,162,921 B2 | 12/2018 | Atta et al. | |
| 10,198,294 B2* | 2/2019 | Chiou | G06F 9/5027 |
| 10,203,967 B1 | 2/2019 | Atta et al. | |
| 10,223,317 B2 | 3/2019 | Atta et al. | |
| 10,250,572 B2 | 4/2019 | Atta et al. | |
| 10,282,330 B2 | 5/2019 | Khan et al. | |
| 10,326,651 B1 | 6/2019 | Johnson et al. | |
| 10,423,438 B2 | 9/2019 | Atta et al. | |
| 2010/0235465 A1 | 9/2010 | Thorpe et al. | |
| 2014/0095443 A1* | 4/2014 | Draese | G06F 16/27 707/661 |
| 2014/0198190 A1* | 7/2014 | Okumu | A61B 5/7445 348/53 |
| 2014/0304398 A1 | 10/2014 | Carlen et al. | |
| 2015/0155006 A1* | 6/2015 | Chou | G11B 27/031 386/230 |
| 2015/0180969 A1 | 6/2015 | Ridel et al. | |
| 2016/0380819 A1* | 12/2016 | Burger | G06F 11/0793 709/221 |
| 2017/0161054 A1* | 6/2017 | Albot | G06F 13/1668 |
| 2018/0091484 A1* | 3/2018 | Atta | H04L 63/0428 |
| 2018/0136943 A1* | 5/2018 | Chew | G06F 1/24 |
| 2018/0165110 A1* | 6/2018 | Htay | G06F 8/65 |
| 2018/0302281 A1* | 10/2018 | Khan | H04L 67/34 |
| 2018/0314550 A1* | 11/2018 | Chen | G06F 9/4881 |
| 2019/0243571 A1* | 8/2019 | Narayanan | G06F 3/0656 |

OTHER PUBLICATIONS

Applebaum Alex: "F5 in AWS Part 5—Cloud-'nit, Single-NIC, and Auto Scale Out in BIG-IP DevCentral", Aug. 17, 2016 (Aug. 17, 2016), Retrieved from the Internet: URL:https://devcentral.f5.com/s/articles/f5-in-aws-part-5-cloud-init-single-nic-andscale-out-of-big-ip-in-v12-21476 [retrieved on Nov. 18, 2021].

Anonymous: "Software-Defined Hardware: Enabling Performance and Agility with the BIG-IP iSeries Architecture", Nov. 11, 2016 (Nov. 11, 2016), Retrieved from the Internet: URL:https://www.f5.com/services/resources/white-papers/software-defined-hardware-enabling-performance-and-agility-with-the-big-ip-iseries-architecture [retrieved on Nov. 17, 2021].

European Search Report for Application No. 21180449.7, Nov. 29, 2021.

Harpak. 'Disrupt the Datacenter With Orchestration.' The Next Platform. Apr. 1, 2020 (Apr. 1, 2020) Retrieved on Aug. 22, 2021 (Aug. 22, 2021) from <https://www.nextplatform.com/2020/04/01/disrupt-the-datacenter-with-orchestration/>.

International Search Report for Application No. PCT/US2021/038074, Oct. 7, 2021.

* cited by examiner

ORCHESTRATING CONFIGURATION OF A PROGRAMMABLE ACCELERATOR

FIELD

This technology generally relates to network traffic management, and more specifically to orchestrating a configuration of a programmable accelerator that can be used to process network traffic.

BACKGROUND

A software application can be distributed or partitioned across different computing devices. For example, a client-server architecture can partition tasks between a client device (such as a laptop or mobile device) and one or more application server computers connected by an interconnection network (such as the Internet) and managed by a provider of computing service(s) and/or computing resource(s). The application server computer(s) can execute software applications to provide virtual resources, software services, and/or content to the client devices. For example, client devices can initiate communication sessions with the application server computers by sending requests over the interconnection network to the application server computers, and the servers can respond to the requests. Additionally or alternatively, the application server computers can push information (without an initiating request) to the client devices over the interconnection network. As the number of client devices seeking access to the application server computers increases, intermediary computing devices, such as network traffic management computing device(s), can be added between the client devices and the application server computers. Network traffic management computing device(s) can perform security, processing, and/or routing functions of the client-server architecture, such as encrypting and/or decrypting traffic between the client and the application server. For example, the network traffic management computing device can potentially increase the scalability, availability, security, and/or performance of the client-server architecture. However, as the complexity of applications increases and the number of interconnected devices increases, there can be many challenges in implementing a high performance, highly available, and secure client-server architecture including an intermediary computing device.

BRIEF SUMMARY

Generally, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One example includes a method implemented in cooperation with a network traffic management system including one or more network traffic management modules, networking modules, or server modules, the method including: executing a first instance of a service within a container runtime. The service comprises a software application and an orchestrator application. The orchestrator application is adapted to configure a programmable hardware accelerator. The software application is adapted to interoperate with the programmable hardware accelerator that is configured by the orchestrator application. The method also includes using the orchestrator application, executing within the container runtime, to retrieve a system image from a file repository. The system image comprises configuration data for the programmable hardware accelerator. The method also includes using the orchestrator application, executing within the container runtime, to configure the programmable hardware accelerator to operate according to the configuration data of the retrieved system image.

Other embodiments incorporating this example include corresponding computer systems, apparatus, and computer programs recorded on one or more non-transitory computer readable media (e.g., computer storage devices), each configured to perform the actions of the methods. An example computer system includes one or more network traffic management modules, networking modules, or server modules, memory comprising programmed instructions stored thereon, and one or more processors configured to be capable of executing the stored programmed instructions to perform the actions of the methods. An example non-transitory computer readable medium having stored thereon instructions for orchestrating a configuration of a programmable accelerator, the instructions comprising executable code that, when executed by one or more processors, causes the processors to perform the actions of the methods. An example network traffic management apparatus includes memory comprising programmed instructions stored thereon and one or more processors configured to be capable of executing the stored programmed instructions to perform the actions of the methods.

DETAILED DESCRIPTION

Introduction

Figure 1:
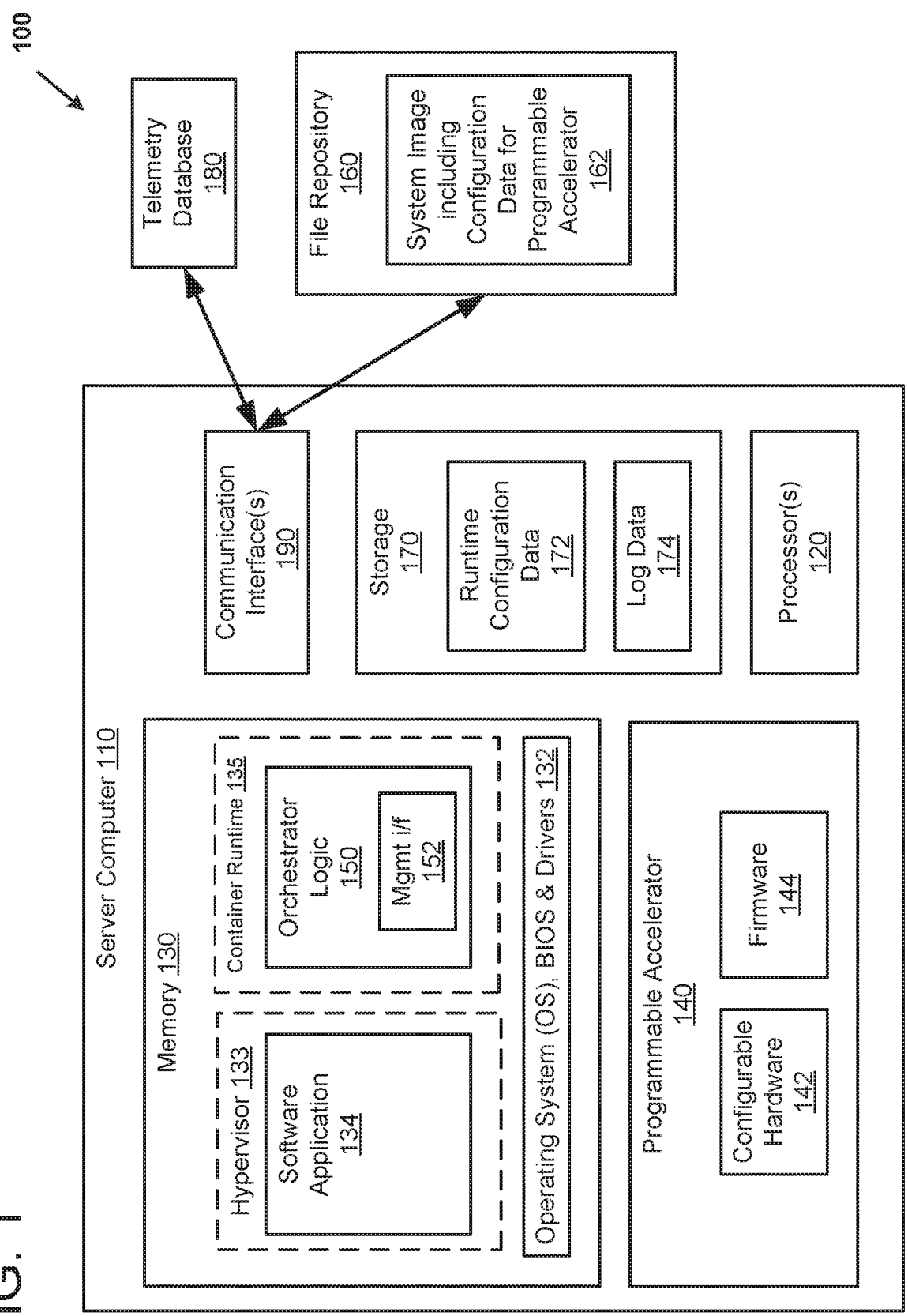
FIG. 1 is a block diagram of an architecture including a programmable accelerator and orchestrator logic for configuring the programmable accelerator.

A computing infrastructure to support a network-accessible client-server software application can include various interconnected computing devices to potentially increase scalability, availability, security, and/or performance of the client-server architecture. As one example, an intermediary server computer can be positioned logically between client devices seeking access to a client-server software application and the server computers that execute the server-side of the client-server software application. An intermediary server computer can perform various proxy and other services, such as load balancing, rate monitoring, caching, encryption/decryption, session management (including key generation), address translation, and/or access control, for example. An intermediary server computer can act as a proxy for an application server. A proxy is an agent that is situated in a path of communication between a client and a server (e.g., an application server) that can intercept communications (e.g., network packets, frames, datagrams, and messages) between the client and the server. Load balancing can include distributing or disaggregating workloads from many clients across different server computers. Additionally, functions performed by the application server computer can be offloaded from the application server computer to the intermediary server computer.

The computing infrastructure can potentially be made more scalable, available, secure, and/or performant by supplementing general-purpose computing resources with specialized computing resources (e.g., hardware accelerators). For example, hardware accelerators can include: security modules supporting blacklists and/or whitelists; Denial of service (DOS) traffic pattern analyzers; modules for detecting TCP/IP SYN flooding; modules for automatically generating and validating SYN-Cookies; access control lists (ACLs); privacy-enhanced mail (PEM) support functionality; firewall functionality; hash or security algorithms that are customized for a specific customer and/or geography; low-latency session handling logic; cryptographic and/or compression functionality (e.g., secure sockets layer (SSL) acceleration); algorithms for network traffic load balancing; application layer, content aware functionality; modules for deep packet inspection; support for processing by artificial intelligence algorithms; support for artificial intelligence (AI) or database (DB) processing; support for data mining; support for bitcoin mining; support for virtual private networking (VPN) and other tunneling protocols.

The right mix of general-purpose computing resources and specialized computing resources can change over time and/or with network traffic patterns. Changing the amounts and/or types of hardware accelerators over time can help to have the right mix of computing resources to support one or more client-server software applications. Programmable accelerators can include general-purpose hardware, specialized circuitry, and/or configurable hardware for performing a computing task. Configurable hardware (also referred to as programmable hardware) can be programmed and/or reprogrammed to implement different hardware accelerators. Configurable hardware is electronic circuitry including multiple logic blocks and a programmable interconnect for connecting the logic blocks together in different configurations. As one example, both the function of the logic blocks and the programmable interconnect can be specified using a configuration file that is stored in a configuration memory of the configurable hardware. Examples of configurable hardware include field-programmable gate arrays (FPGAs) and complex programmable logic devices (CPLDs). Firmware can be used to further program a hardware accelerator. For example, the hardware accelerator can include control registers that are architecturally visible to software and/or firmware. The control registers can be modified (e.g., written to) by the firmware to modify the functionality of the accelerator.

As the number of components in the computing infrastructure increases, it can be challenging to track all the components that are deployed within a system. In addition to the different devices, different versions of software, firmware, and hardware accelerators can be deployed. Deploying a sub-optimal mix of components can potentially cause a client-server application to be less available, less secure, and/or less performant.

As described herein, a computing infrastructure can include a cloud or sea of server computers with programmable accelerators. A programmable accelerator includes hardware that is dedicated to accelerating a computing task, where the accelerator hardware is separate from and in addition to a general-purpose processor of the server computer. A programmable accelerator can include configurable hardware that is programmed to perform the task, a dedicated co-processor programed with software to perform the task, and/or an application-specific integrated circuit (ASIC) with programmable controls to perform the task, for example. The configuration of the programmable accelerators can be orchestrated to support large deployments of hardware and compute services by consistently, remotely, and dynamically enabling: secure distribution and loading of programmable accelerator configuration files (e.g., bit files) for distribution of upgrades, downgrades, or changed functionality of a programmable accelerator; runtime configuration of programmable accelerator applications; monitoring programmable accelerator system health; monitoring programmable accelerator environmental conditions, such as operating temperature, voltage, and current; running programmable accelerator system diagnostics; collecting programmable accelerator analytics; and providing remote telemetry of programmable accelerator functionality. An orchestrator can also generate notifications and/or trigger higher level system orchestration events based on accelerator health, status, performance, and/or utilization. As one example, the acceleration orchestrator can integrate into an existing higher-level ecosystem level orchestration tool to trigger orchestration events at an ecosystem level via a network or web interface.

Different architectures can be used for orchestrating the configuration of the programmable accelerators. As one example, a programmable accelerator orchestrator can execute on each node (e.g., a server computer) and can be used to orchestrate configuration of all programmable accelerators on the node. Higher-level (e.g., at the data center or rack level) control, accounting, and monitoring can be enabled using a management interface or application programming interface (API) of the node-level orchestrator. Various aspects of the node-level orchestrator are illustrated with reference to FIGS. 1-3. As another example, a programmable accelerator orchestrator can be packaged within a service and can execute within a container runtime module on a computing node and can be used to orchestrate configuration of a programmable accelerator on the node. The container-level orchestrator can enable a general container management system (such as KUBERNETES) to deploy and scale application services that leverage programmable accelerators. The container-level orchestrator shares aspects with the node-level orchestrator and is further described with reference to FIGS. 4-5. As another example, a programmable accelerator orchestrator can be distributed among a management server computer and additional computing nodes to implement a software-as-as service application. The distributed orchestrator can execute headlessly and orchestrate a sea of programmable accelerators at scale.

The distributed orchestrator shares aspects with the node-level orchestrator and is further described with reference to FIG. 6.

Common aspects of the orchestrator architectures include packaging configuration data in a system image and distributing the system image via a file repository. A system image is a state of some or all components (e.g., one or more computer-readable memories) of a computer system that are encapsulated at a specific point in time (e.g., at a start or boot time, at a process-swap time, and so forth). The system image can also include metadata, such as metadata for identifying different portions of the image and for verifying an integrity of the contents of the system image. The system image can be stored in a computer-readable medium as one or more files or other data structures. As one example, a system image can be organized as a file having variable sized sections, where each section of the file includes the state of a different memory component of the computer system at a launch time. Metadata of the system image can specify the size and/or relative position of each section and identify the component associated with each section. As a specific example, the system image can include a hardware configuration data section including data to be loaded in a memory of a programmable logic device for configuring the programmable logic. As another example, the system image can include configuration data for the programmable accelerator and executable orchestrator code that provides an API, diagnostics, health monitoring, analytics, and configuration functions for the orchestrator. A file repository is a computing system for storing data (e.g., files and/or system images). The file repository can provide storage resources, access control, a version control system, data integrity, and other services and/or resources over a private or public communications network. As one example, the file repository can generate a system image signature for each system image that can be used by a client of the file repository to validate the sender and the data integrity of the system image.

Examples of Orchestrating a Configuration of a Programmable Accelerator on a Computing Node FIG. 1 is a block diagram of an architecture 100 including a programmable accelerator 140 and orchestrator logic 150 for configuring the programmable accelerator 140. The architecture 100 can include a server computer 110, a telemetry database 180, and a file repository 160. The server computer 110 can communicate with the telemetry database 180 and the file repository 160 using the communication interface(s) 190. For example, the communication interface(s) 190 can be connected to a public or private communications network providing communication paths among the server computer 110, the telemetry database 180, and the file repository 160. The server computer 110, the telemetry database 180, and the file repository 160 can each be implemented using a computing environment as described in more detail with reference to FIG. 8.

The server computer 110 can include the processor(s) 120, memory 130, a programmable accelerator 140, storage 170, and the communication interface(s) 190. The different components (120, 130, 140, 170, and 190) of the server computer 110 can be interconnected using a local interconnect (not shown) of the server computer 110 so that the different components can communicate with each other. The communication interface 190 can be used to send and receive communications (e.g., network packets) with other computing devices, such as a client and a server. The processor 120 can be used to execute computer-executable instructions that are stored in the memory 130 and/or storage 120. The computer-executable instructions can be organized into software routines (also referred to as modules or components) comprising executable code to perform various computing tasks. The memory 130 can also include structured and/or unstructured data that is used by the software routines to perform the computing tasks. It should be noted that while FIG. 6 illustrates one organization of routines, other organizations are possible. For example, the illustrated routines can be sub-divided into smaller routines and/or combined into larger routines.

The operating system (OS), basic input/output system (BIOS), and drivers 132 can include different software routines (e.g., kernel routines, BIOS settings, and device drivers) for managing different aspects of the execution of programs (e.g., software application 134 and orchestrator logic 150) and for interfacing with the hardware (e.g., the processor 120 and the programmable accelerator 140) of the server computer 110. For example, the OS 132 can manage the loading and removal of data, software applications, and other routines into the memory 130 of the server computer 110; the OS 132 can manage storage resources (e.g., storage 170) of the server computer 110; the OS 132 can manage processes and/or threads executing on the processor 120; the OS 132 can manage power states of the server computer 110; the OS 132 can provide an interface for applications and other routines to send and receive communications (e.g., network packets) using the communications interface 190; and the OS 132 can enable inter-process communication between different routines executing on the server computer 110. The OS and BIOS 132 can enable virtualization on the server computer 110. The OS 132 can include device drivers that are used for communicating between a program and hardware of the server computer 110. A device driver is a software that provides an interface between a program and computer hardware. Device drivers are generally specific to a particular operating system. As a specific example, a device driver can provide an interface between user-level programs and the programmable accelerator 140. Different programs may have different device drivers for accessing the programmable accelerator 140.

Programs can execute in a variety of ways on the server computer 110, such as directly on the OS 132, within a hypervisor 133, or within a container runtime 135. For example, a program can be launched from and be executed using the OS 132. When the program is launched from the OS 132, the services of the OS 132 can be directly accessed by the program. Additionally or alternatively, programs can be executed within an encapsulated software environment that runs on the OS 132.

A program can run within a virtual machine that is managed by a hypervisor (e.g., hypervisor 133). A virtual machine is an emulated computer system. The virtual machine can provide virtual storage, computation, networking, and memory resources. A hypervisor is software that performs the emulation of the virtual machine and provides a guest operating system for the program to execute within. A type 1 hypervisor (also referred to as a bare metal hypervisor) executes directly on the hardware (e.g., the processor 120) and a type 2 hypervisor executes on a host operating system (e.g., OS 132) that provides virtualization services. The hypervisor provides a layer of abstraction between the program and the OS 132 and the physical hardware. In other words, the program executes on the guest operating system of the virtual machine which is emulated by the hypervisor, and the hypervisor communicates with the OS 132 which communicates with the hardware of the server computer 110. Using virtual machines can make a program more portable (e.g., because a virtual machine can have the same architecture even when executing on different physical hardware) and can potentially result in a fairer allocation of the server computer 110 resources when multiple programs are running concurrently on the server computer 110. The hypervisor can provide isolation between the different virtual machines executing on the hypervisor by allocating private resources for the individual virtual machines. On the other hand, virtual machines can add abstraction layers (compared to executing directly on the OS 132) that can potentially make a program less efficient to execute. An example type 2 hypervisor is the kernel-based virtual machine (KVM) packaged with some Linux releases; an example type 1 hypervisor is the VMWARE hypervisor.

A program can run within a container runtime (e.g., container runtime 135). A container runtime is software that provides an encapsulated environment for a program to execute within. The encapsulated environment can be less complex than a full virtual machine and a guest operating system executing within a hypervisor. For example, OS routines can be shared between containers which can provide less isolation between the containers as compared to between virtual machines. One or more programs that run within a container can be referred to collectively as a service or a microservice. The container runtime can provide storage, computation, networking, and memory resources for the services executing on the container runtime. Multiple services can run within the container runtime. The container runtime can potentially enable programs to be more portable (e.g., because a container can have the same architecture even when executing on different physical hardware) compared to running directly on the OS 132. Programs executing within the container runtime may be less efficient than running directly on the OS 132 but more efficient than running in a virtual machine. On the other hand, programs executing within the container runtime may be more impacted by other programs executing within the container runtime as compared to programs running in different virtual machines. Example container runtimes are DOCKER and KUBERNETES.

The programmable accelerator 140 can be programmed to implement one or more hardware accelerators. Specifically, a hardware accelerator can be implemented using the configurable hardware 142 and the firmware 144. As another example, a hardware accelerator can be implemented using dedicated hardware (e.g., a programmable processor, co-processor, ASIC, or graphics processor) that is different than and in addition to the processor 120. For example, the hardware accelerators can include: security modules supporting blacklists and/or whitelists; DOS traffic pattern analyzers; modules for detecting TCP/IP SYN flooding; modules for automatically generating and validating SYN-Cookies; access control lists (ACLs); privacy-enhanced mail (PEM) support functionality; firewall functionality; hash or security algorithms that are customized for a specific customer and/or geography; low-latency session handling logic; cryptographic and/or compression functionality (e.g., secure sockets layer (SSL) acceleration); algorithms for network traffic load balancing; application layer, content aware functionality; support for virtual private networking (VPN) and other tunneling protocols. As one example, the programmable accelerator 140 can be implemented as a printed circuit assembly (also referred to as an expansion card or a card) that is accessed over a local interconnect (e.g., Peripheral Component Interconnect (PCI) Express) of the server computer 110.

The configurable hardware 142 can include programmable logic such as a field-programmable gate array (FPGA), a programmable logic array (PLA), a programmable array logic (PAL), a generic array logic (GAL), or a complex programmable logic device (CPLD), for example. As one example, the configurable hardware 142 can include look-up tables (LUTs) that specify truth-tables for combinatorial logic, default values for storage elements (e.g., flip-flops), and connections between different routing channels that link the logic and storage elements. As another example, the configurable hardware 142 can include hard and/or soft processors and program memory for storing code that is executable by the hard and/or soft processors. As another example, the configurable hardware 142 can include customized hardware blocks (e.g., data-paths and pipelined processing elements) that can be selected and/or interconnected using programmable routing channels.

The configurable hardware 142 can be programmed at different levels and at different times. As one example, a hardware configuration of the configurable hardware 142 can initially be programmed, using the orchestrator logic 150, by loading hardware configuration data on control logic of the configurable hardware 142. The hardware configuration specifies the function of the hardware circuitry as the configurable hardware 142 exits a programming state or a reset state. In other words, the hardware configuration data programs the functionality of the electronic circuitry of the configurable hardware 142. The hardware configuration data can include the data that is loaded on the LUTs to control the functionality of the configurable hardware 142. The hardware configuration data can be loaded into a configuration memory of the configurable hardware 142 prior to being loaded on the control logic. The configurable hardware 142 can be programmed by writing directly to the configuration memory elements and/or by using a configuration engine (not shown) of the configurable hardware 142. For example, the configuration engine can control the sequencing of the operation and programming of the configurable hardware 142 so that portions of the configurable hardware 142 can be operational while other portions of the configurable hardware 142 are being configured or reconfigured (this may be referred to as partial reconfiguration).

As another example, a runtime configuration of the configurable hardware 142 can be programmed, using the orchestrator logic 150 and/or the software application 134, by programming firmware 144 of the configurable hardware 142. The firmware 144 is executable code (e.g., microcode), control data, and/or operational data that is applied to a hardware configuration of the configurable hardware 142 during a runtime (e.g., after reset is deasserted) of the configurable hardware 142. Accordingly, the firmware 144 is different from the hardware configuration data of the configurable hardware 142 based on when the programming occurs and where the programming is stored. The firmware 144 can be written to memory elements and control registers of the configurable hardware 142. Control registers can be modified (e.g., written to) to modify the functionality of the accelerator without changing the underlying electronic circuitry.

The file repository 160 can be used to store configuration data for the programmable hardware accelerator, where the configuration data can include the hardware configuration data and firmware. The file repository 160 can be a remote server computer that communicates with the server computer 110 via a communications network. The file repository 160 can include features for enabling version control, backups, access control, encryption, verification of data integrity, and other features suitable for storing data in a secure and reliable manner. As one example, the file repository 160 can include a file server application that communicates and interoperates with a file client application. For example, the container runtime 135 can include an integrated file client application that communicates with the file repository 160. The file repository 160 can store system images, such as the system image 162. The system image 162 can include the configuration data for the programmable hardware accelerator. The system image 162 can include additional data, such as executable code for the orchestrator logic 150, for example.

The orchestrator logic 150 can be used to orchestrate the configuration of the programmable accelerator 140. The orchestrator logic 150 can include additional modules such as diagnostics, health monitoring, and analytics for the programmable accelerator 140. The orchestrator logic 150 can implement a configuration sequence, such as described below with reference to FIGS. 2 and 3, for sequencing the configuration of components of the server computer 110. The orchestrator logic 150 can be initiated from a user interface (e.g., a command line interface (CLI) or graphical user interface (GUI)) of the OS 132, from another application, or headlessly (e.g., from a script or boot-up sequence). The orchestrator logic 150 can execute directly as a process managed by the OS 132 or as a process managed by the container runtime 135. As one example, the container runtime 135 can be used to retrieve a system image (e.g., the system image 162) from the file repository 160, and the system image can be executed within a container of the container runtime 135. For example, the system image can include a code segment with a program (e.g., the orchestrator logic 150) for loading the configuration data onto the programmable accelerator 140. The system image can include a data segment where the configuration data of the programmable accelerator 140 is stored. By packaging the orchestrator logic 150 with the configuration data of the programmable accelerator 140 together in a single system image, compatibility of the loader and the configuration data can be ensured. As another example, the orchestrator logic 150 can execute directly on the OS 132 and can retrieve the system image 162 from the file repository 160. For example, the system image 162 can include the configuration data for the programmable accelerator 140, and orchestrator logic 150 can cause the configuration data to be loaded to the programmable accelerator 140.

The orchestrator logic 150 can enable other components of the server computer 110 to interoperate with the programmable accelerator 140. For example, the orchestrator logic 150 can configure the BIOS, such as by directly executing BIOS commands. Configuring the BIOS can include enabling virtualization. For example, the orchestrator logic 150 can install and/or enable various device drivers and/or kernel-level modules of the OS 132. For example, the orchestrator logic 150 can enable and/or install a Single Root Input-Output Virtualization (SR-IOV) module to enable the programmable accelerator 140 to communicate over a PCI Express interconnect. The executable code for the SR-IOV module can be included in the system image 162 or can be pre-installed with the OS 132. The management interface (Mgmt i/f) 152 can be used by an administrator or another user to monitor and/or modify operational data and/or configuration data of the programmable accelerator 140. For example, a client device (not shown) can communicate with the management interface 152 over the communication interface 190 by issuing a request conforming to an API of the management interface 152. For example, the management interface 152 can be used to supplement programming of the programmable accelerator 140, such as by modifying the firmware 144.

The orchestrator logic 150 can communicate with the telemetry database 180, using the communication interface 190, to provide configuration and operational data to the telemetry database 180. For example, the telemetry database 180 can include configuration data for server computers within a datacenter so that a utilization of the computers can be determined. The configuration data can map the software, firmware, and configurable hardware that is implemented on each of the server computers within the datacenter. Additionally, the orchestrator logic 150 can include modules for monitoring the server computer environment and the data being processed by the programmable accelerator 140. For example, the data collected and sent to the telemetry database 180 can include results of running diagnostic tests on the programmable accelerator 140, periodic environmental conditions (such as operating temperature, voltage, and current), soft error counts of memories, inbound packet counts, outbound packet counts, an attack status (such as a number of times that an attack has been detected), average network traffic latency, TCP response time, packet drop rates, the detection of various traffic patterns, the detection of a packet signature, and so forth. The telemetry database 180 and the configuration data stored therein can be served by a single server computer or among multiple distributed server computers.

The software application 134 can interoperate with the programmable accelerator 140 after the programmable accelerator 140 has been configured by the orchestrator logic 150. The software application 134 can execute directly on the OS 132, within the container runtime 135, or within the hypervisor 133. For example, the software application 134 can be a user-level application (as opposed to a kernel-level or privileged application) that can be used to monitor and/or adapt the programmable accelerator 140. As a specific example, the programmable accelerator 140 can be used to process network traffic and the software application can be used to manage network traffic, such that the combination of the programmable accelerator 140 and the software application 134 perform the operations of an application delivery controller. For example, the software application 134 can include modules for customizing the programmable accelerator 140, such as by populating network addresses of an application and its corresponding application servers, supplying credentials and keys, programming DoS vectors, enabling or disabling the offloading cryptographic tasks (such as Transport Layer Security (TLS) encryption and decryption), and monitoring the network traffic. As one example, the software application 134 can communicate with the programmable accelerator 140 by communicating messages across an interconnect (not shown) of the server computer 110 using a driver (e.g., SR-IOV) of the OS 132.

The orchestrator logic 150 can store operational and configuration data in the storage 170. For example, configuration data that supplements the configuration data from the system image 162 can be stored in the runtime configuration data 172. As a specific example, the orchestrator logic 150 can snoop configuration data that is applied by the management interface 152 or the software application 134 as the configuration data is being sent to the programmable accelerator 140, and the snooped configuration data can be stored in the runtime configuration data 172. As another example, operational data, such as environmental conditions, events and/or statistics associated with the data processed by the programmable accelerator 140 can be stored in the log data

174. The log data 174 can also include a history of updates to the software application 134, the orchestrator logic 150, and the programmable accelerator 140. The log data 174 can include a history of users accessing the orchestrator logic 150 and the software application 134.

Figure 2:
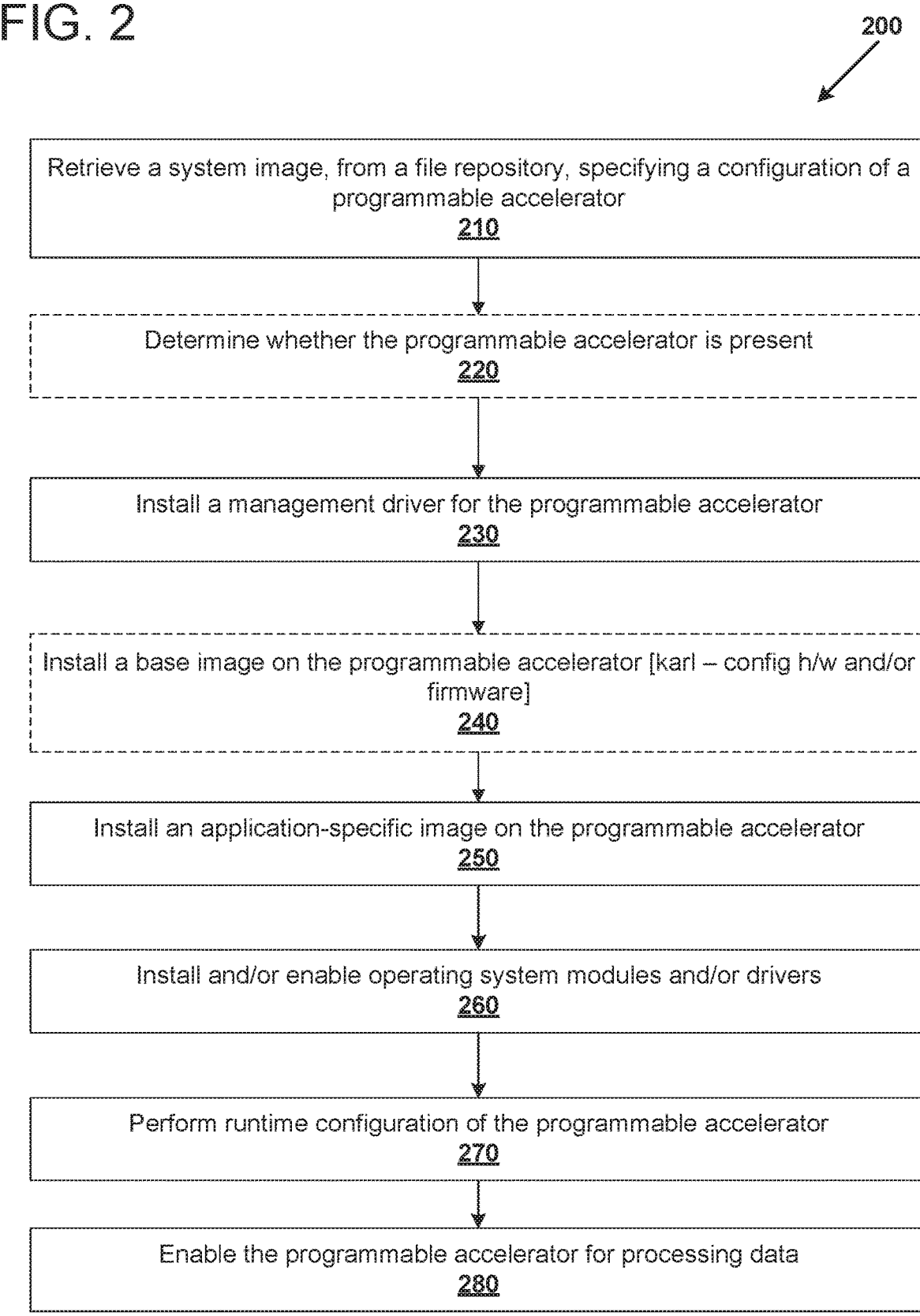
FIG. 2 is a flowchart of an example method for orchestrating the configuration of a programmable accelerator.

FIG. 2 is a flowchart of an example method 200 for orchestrating the configuration of a programmable accelerator (such as the programmable accelerator 140 of FIG. 1). Specifically, the method 200 can coordinate and sequence the configuration of the programmable accelerator within a computer system, such as the computer system of FIG. 1. As a specific example, computer-executable instructions for carrying out the method 200 can be stored in computer-readable memory (e.g., the memory 130) and the instructions can be executed by one or more processor(s) (e.g., the processor 120) to perform the method 200.

At 210, a system image can be retrieved from a file repository. The system image can include configuration data for programmable accelerator. The configuration data can include a hardware configuration (e.g., a bit file) for configuring configurable hardware and/or firmware for programming the configurable hardware after the hardware configuration has been programmed onto the configurable hardware. As one example, the configurable hardware can include multiple configurable regions that can be configured at the same or different times. The hardware configuration can include multiple hardware configurations corresponding to the different re-configurable regions. As a specific example, a first hardware configuration can include a base configuration for enabling the programmable hardware to communicate with an interconnect using a particular software driver and for providing basic functionality for the programmable hardware. A second hardware configuration can include functionality that is associated with a software program that will execute on the computer system. The system image can include executable code for orchestrator logic which will be programmed into the programmable logic with the hardware configuration and/or the firmware. The file repository can include a file repository server program which communicates with a file repository client program. The file repository client program can be used to retrieve or pull the system image from the file repository. The file repository client program can use a digital signature sent with or as part of the system image to validate the data integrity of the system image. For example, the file repository server can create the digital signature using a private key of the file repository server when the system image is loaded to the file repository server. The file repository client program can use a public key of the file repository server to validate the digital signature sent with the system image when it is retrieved by the file repository client program.

At optional 220, it can be determined whether the programmable accelerator is present. As one example, the server computer 110 can include a file or other data structure (e.g., a registry) stored in the memory 130 or storage 170 that identifies drivers, hardware, and/or other configuration settings of the server computer 110. The file or other data structure can be searched to determine whether the programmable accelerator is present. As another example, components of the server computer 110 can be interrogated to determine whether any of the components are or include the programmable accelerator. For example, each of the components connected to an interconnect of the server computer 110 can include a register that identifies a type of the component. The types of the components can be compared to the programmable accelerator type to determine whether the programmable accelerator is present. As one example, the operations at 220 can occur during a device discovery sequence where device identification registers and vendor registers are read.

At 230, a management driver can be installed for the programmable accelerator. As one example, the management driver can include the orchestrator logic 150. As another example, the management driver can include a hardware driver for the programmable accelerator that enables the orchestrator logic 150 to interface to the configuration hardware of the programmable accelerator.

At optional 240, a base image can be installed on the programmable accelerator. The base image can include a hardware configuration for one or more re-configurable regions of the configurable hardware. The base image can include firmware to apply to the hardware configurations of the base image. For example, the base image can include input and output logic for the configurable hardware so that different applications may access the programmable accelerator. The base image can include sandbox areas which only allow specified transactions at the interface of the sandbox and the other re-configurable regions. The sandbox areas can be re-configurable regions that are reserved for a particular software application and that have limited capabilities when accessing internal components of the server computer 110. By limiting the interactions that can occur with the other components of the server computer 110, a security of the server computer 110 and the data center in which it resides can potentially be increased. Installing the base image can include loading a configuration memory of the configurable hardware. As one example, the configuration memory can be loaded by writing directly to the configuration memory. As another example, the configuration memory can be loaded by interfacing with a configuration port that may load the configuration memory using a scan chain or other serialized connection. The contents of the configuration memory can be copied from the configuration memory to the control logic of the configurable hardware to complete the programming of the configurable hardware.

At 250, an application-specific image can be installed on the programmable accelerator. Specifically, the image can be customized to work with a particular software application (e.g., the software application 134). The application-specific image can include a hardware configuration for one or more re-configurable regions of the configurable hardware and firmware to be applied to the configurable hardware. Specifically, the application-specific image can include a hardware accelerator that is customized to work with the software application. As described above, the application-specific hardware configuration can be loaded to the configuration memory of the configurable hardware by writing directly to the configuration memory and/or by using a configuration port the load the configuration memory. The application-specific image can be loaded before or after the base image (if used) is operational. As one example, the configurable hardware can be held in a reset or a programming mode while both the base image and the application-specific image are loaded onto the configurable hardware. As another example, the base image can be loaded, reset can be deasserted, and then the application-specific image can be loaded while the base image is operational.

At 260, operating system modules and/or drivers can be installed and/or enabled. The modules and/or drivers can enable the software application to communicate with the programmable logic. As one example, an SR-IOV module can be installed. As one example, the drivers and/or modules can be encapsulated in the system image that is retrieved from the file repository. As another example, metadata within the retrieved system image can specify a version of the drivers and/or the modules that are to be used, and the executable code for the drivers and/or the modules can be external to the system image.

At 270, runtime configuration of the programmable accelerator can be performed. The runtime configuration can include settings and/or code that is applied while the programmable hardware is active (e.g., when reset is deasserted). As one example, the hardware can be active for programming prior to the hardware being active for processing data. As another example, data processing and runtime configuration can be performed concurrently. Performing runtime configuration can include writing to control registers of the programmable hardware, loading credentials on the programmable hardware, loading microcode onto the configurable data path, loading a program memory for execution by a hard or soft processor of the programmable hardware, and any other configuration that occurs during a runtime of the programmable accelerator. The runtime configuration can occur by issuing commands from the management interface 152 and/or the software application 134. The commands can be communicated, via an OS driver, to the programmable accelerator, where the commands can be performed. The commands used to generate the runtime configuration and/or the state of the programmable accelerator as the runtime configuration is applied can be recorded and stored (such as in the runtime configuration data 172).

At 280, the programmable accelerator can be enabled for processing data. As one example, the status of the programmable accelerator can be communicated using a control register of the programmable accelerator. Specifically, the management interface 152 or the software application 134 can read the status register to determine whether the programmable accelerator is enabled for processing data. As another example, the management interface 152 or a software application 134 can write the status register to enable the programmable accelerator for processing data. Processing the data can include receiving network traffic at a network interface and performing a management function to the network traffic before dropping or forwarding the network traffic from the network interface. For example, processing the data can include performing encryption, decryption, or other cryptographic operations. As another example, processing the data can include authorizing and/or authenticating a user associated with the traffic.

Figure 3:
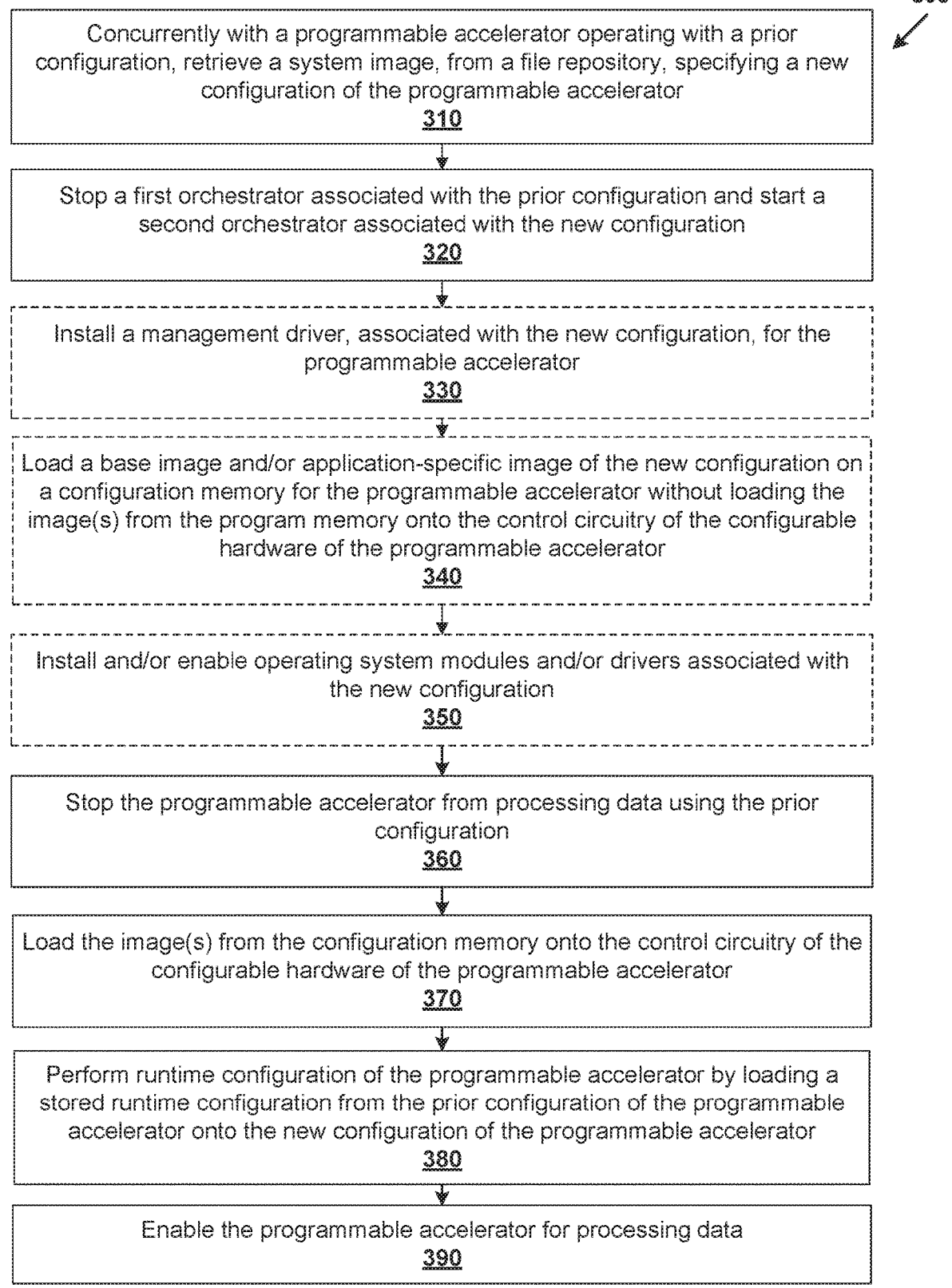
FIG. 3 is a flowchart of an example method for orchestrating a change of the configuration of a programmable accelerator.

FIG. 3 is a flowchart of an example method 300 for orchestrating a change of the configuration of a programmable accelerator (such as the programmable accelerator 140 of FIG. 1). Specifically, the method 300 can coordinate and sequence a change or update of a configuration of the programmable accelerator within a computer system, such as the computer system of FIG. 1. As a specific example, computer-executable instructions for carrying out the method 300 can be stored in computer-readable memory (e.g., the memory 130) and the instructions can be executed by one or more processor(s) (e.g., the processor 120) to perform the method 300.

At 310, a programmable accelerator (e.g., the programmable accelerator 140) can be operating with a prior configuration concurrently with a new configuration being retrieved from a file repository. For example, the prior configuration can be an older version of a configuration for the programmable accelerator and the new configuration can be an updated version of the configuration. The new configuration can be stored in a system image that is stored on the file repository (e.g. the file repository 160). The system image can include a hardware configuration for the configurable hardware, firmware, executable code for an orchestrator, hardware drivers, and/or metadata describing the contents of the system image.

At 320, a first orchestrator associated with the prior configuration can be stopped and a second orchestrator associated with the new configuration can be started. For example, the retrieved system image can include executable code for the second orchestrator. The second orchestrator can be used to reconfigure the programmable accelerator and/or other components of the server computer with the new configuration and to potentially reduce interruption to processing data by the programmable accelerator.

At optional 330, a management driver, associated with the new configuration, for the programmable accelerator can be installed. For example, installing the management driver can be omitted when the management driver is identical to a management driver installed by the first orchestrator. The management driver can include a hardware driver for the programmable accelerator that enables the orchestrator logic to interface to the configuration hardware of the programmable accelerator.

At optional 340, a base image and/or an application-specific image of the new configuration can be loaded onto a configuration memory of the programmable accelerator, without loading the image(s) onto the control circuitry of the programmable accelerator. The image(s) can include a hardware configuration and/or firmware for the programmable accelerator. Since the image(s) are not loaded onto the control circuitry of the programmable accelerator, the programmable accelerator can continue to process data according to the prior configuration.

At optional 350, operating system modules and/or drivers associated with the new configuration can be installed and/or enabled. Installing new operating system modules and/or drivers may cause the communication stream between the software application and the programmable accelerator to be temporarily unavailable while the modules and/or drivers are installed. When the new configuration and the prior configuration use the same operating system modules and/or drivers, the installation can be omitted. BIOS settings can also be changed and/or updated. For example, BIOS settings can be used to configure fan speeds for cooling, enable virtualization, and enable performance enhancements such as hyperthreading.

At 360, the programmable accelerator can be stopped from processing data using the prior configuration. As one example, newly received network data to be processed by the programmable accelerator can be buffered in a memory while the programmable accelerator is stopped. Network traffic being processed when the stop command is received can be completed before the programmable accelerator is stopped. In this manner, a time for reconfiguring the programmable accelerator can potentially be reduced so that the programmable accelerator is more available for processing network traffic.

At 370, the image(s) from the configuration memory can be loaded onto the control circuitry of the configurable hardware of the programmable accelerator. By loading the image(s) onto the control circuitry, the prior configuration of the programmable accelerator will be overridden by the new configuration of the programmable accelerator. The new images can be loaded on some or all of the different re-configurable regions of the configurable hardware.

At 380, runtime configuration of the programmable accelerator can be performed by loading a stored runtime configuration from the prior configuration of the programmable accelerator onto the new configuration of the programmable accelerator. As one example, the runtime configuration for a given server computer can be unique to the server computer and so the runtime configuration is not captured in the system image that is stored in the file repository. However, as described above with reference to 270, the runtime configuration of the programmable accelerator can be captured as it is being configured and stored in the memory or storage of the server computer. Accordingly, the runtime configuration that was performed for the programmable accelerator using the prior configuration can be recorded and available to use for the new configuration of the programmable accelerator. The state of the stored runtime configuration can be applied by directly writing the state of the programmable accelerator and/or by repeating the commands that occurred during the runtime configuration. The orchestrator logic can manage reloading the runtime configuration on the programmable accelerator that is configured according to the new configuration.

At 390, the programmable accelerator can be enabled for processing data. For example, any buffered network traffic can be released for processing by the programmable accelerator. A status register of the programmable accelerator can be used to indicate the programmable accelerator is enabled for processing data.

Figure 4:
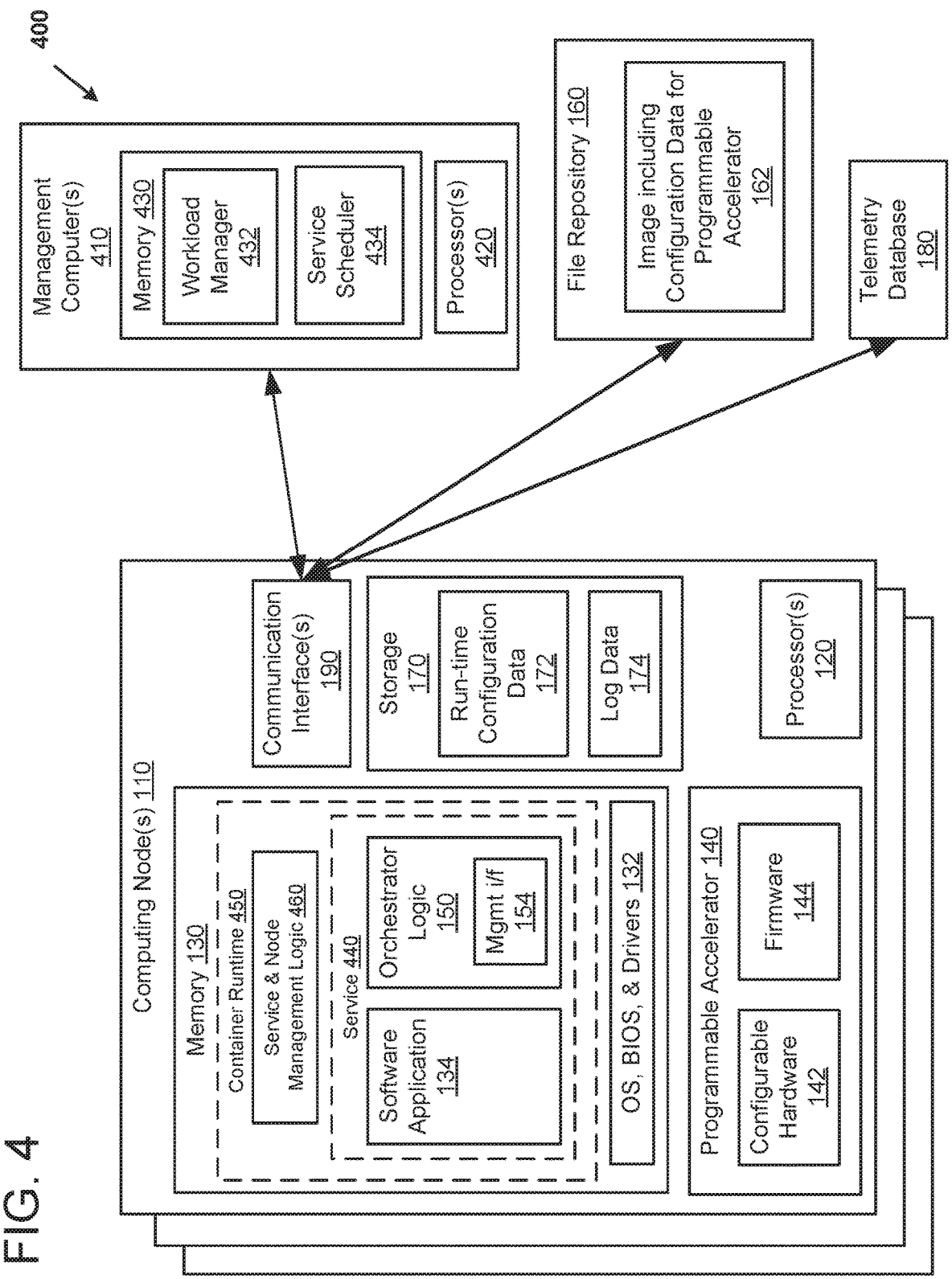
FIG. 4 is a block diagram of an example architecture including a distributed computing system implementing a method for scheduling services and orchestrating a configuration of a programmable accelerator.

Examples of Orchestrating a Configuration of a Programmable Accelerator on a Computing Node within a Service Framework FIG. 4 is a block diagram of an example architecture 400 including a distributed computing system implementing a method for scheduling services and orchestrating a configuration of a programmable accelerator 140. The architecture 400 is capable of executing a workload composed of one or more services (e.g., service 440) and/or microservices. The distributed computing system can include a management computer 410, one or more computing nodes 110, a file repository 160, and a telemetry database 180, where each of the components can communicate with each other over a communication channel, such as a private or public communications network. Each of the management computer 410, the one or more computing nodes 110, the file repository 160, and the telemetry database 180 can be implemented using a computing environment as described in more detail with reference to FIG. 8. Generally, the components 432, 434, 450, and 460 create a service framework (also referred to as a container framework) for managing workloads executing on a cluster of computing nodes (e.g., the computing node(s) 110).

A service framework is a software management system that can be used to manage software workloads executing on a cluster of computing nodes (e.g., the computing nodes 110). An example service framework is Kubernetes. The framework can provide an infrastructure that decouples the workload from the physical hardware that is executing the workload. By decoupling the workload from the hardware, the workload can potentially be more portable across different hardware and operating systems. The framework can include workload control functions (also referred to as a control plane or management functions) and workload execution functions (also referred to as a data plane). The control functions can enable a workload to begin operation, distribute its computing tasks, discover other services and/or workloads, discover resources of the framework (such as storage, networking, and messaging), and monitor resource utilization and availability. The execution functions can enable the workload to execute on the cluster of nodes, communicate with other workloads, and utilize resources of the computing nodes. The service framework can communicate with one or more operating systems of the cluster of nodes and/or with the hardware of the nodes.

Generally, service frameworks are implemented to provide a platform for executing workloads on a cluster of general-purpose computers that include general-purpose computing resources, such as a general-purpose processor (e.g., the processor 120) and memory. The service framework can schedule workloads to the computing nodes based on estimated requirements of the workload and available computing resources. For example, a workload can include multiple services, where each service performs a sub-task of the workload and interoperates with the other services to perform the operations of the workload. The services of the workload can be deployed and scaled based on the type of service, estimated resource requirements, and real-time load monitoring of the computing nodes. Scheduling is assigning a given task (e.g., a service) to a particular resource (e.g., a computing node) so that the task can be completed. A scheduler is hardware and/or software the performs scheduling. For example, the scheduler can be used to schedule the sub-tasks (e.g., the services) of a given workload and/or of multiple workloads for execution on a computing cluster.

The service 440 (also referred to as a microservice or a workload) executed by the architecture 400 can be performed using one or more applications that are bundled within the service 440. A service is executable software code of bounded scope that can be independently deployed and supports interoperability with other services. Services generally use lightweight protocols to communicate over a network and/or within a service framework. A given service can be composed of one or more microservices that interoperate to perform the functionality of the service. For example, a group of microservices can be used to perform a service, such as processing a uniquely identifiable slice of network traffic. Different services can process different slices of network traffic. For example, different slices of network traffic can be handled differently, such as by using different disaggregation (DAG) algorithms, communication protocols, quality of service (QoS) and rate limiting, and denial of service (DOS) protection. The different slices of traffic can be identified using different attributes and/or fields within one or more layers of the network packets.

The management computer 410 can perform management tasks of the service framework, such as managing the distribution and execution of one or more workloads on the computing nodes 110. The management computer 410 can include a workload manager 432, a service scheduler 434, and workload and resource state (not shown). The workload manager 432 and the service scheduler 434 can include hardware, software, or a combination of hardware and software. As one example, the workload manager 432 and the service scheduler 434 can be executable software code stored in the memory 430 and executed by the processor(s) 420. However, while FIG. 4 illustrates one organization of routines, including the workload manager 432 and the service scheduler 434, other organizations are possible. For example, the illustrated routines can be sub-divided into smaller routines and/or combined into larger routines. As another example, the management computer 410 components can be running in one or more virtual machines (VMs) executing on a cloud-based computing environment that is managed or supervised by a hypervisor. The workload and resource state can be data that is stored in memory (e.g., memory 430) and/or storage (not shown) of the management computer 410. The workload and resource state can include data that is representative of the state of the workloads and the computing nodes 110.

The workload manager 432 can provide an interface for a user of the management computer 410 to launch, control, remove, and receive results from workloads. Each of the workloads can be specified using a graphical user interface (GUI), a command-line interface (CLI), and/or a script or program written in a programming language. For example, a workload can be composed of different services that communicate with each other and the workload manager 432. A script, program, or other input can specify which services are used for the workload and communication channels between the different services. Each service can be specified using an application programming interface (API) that can include information about the service including: a type, a function, interface(s), communication protocol(s), estimated resource requirements, preferred resources, quality-of-service constraints, scheduling policies, and other attributes. For example, the API can specify estimated resource requirements including CPU cores, cryptographic engines, programmable hardware, and/or networking bandwidth. The API can specify scheduling policies for the service including an affinity or anti-affinity for differently configured computing nodes. As another example, the API can specify advanced features of a service. For example, the API can specify that the service uses a programmable accelerator. The workload manager 432 can determine when a service is to be deployed and/or removed, and the workload manager 432 can communicate this information to the service scheduler 434.

The workload manager 432 can be used to bundle different software routines into a service. For example, the workload manager 432 can bundle the software application 134 and the orchestrator logic 150 together into a single service. When applications are bundled together as one service, the different applications can execute within a single container of a container runtime (e.g., the container runtime 450) executing on a single computing node. For example, the software application 134 and the orchestrator logic 150 can be bundled together as the service 440 that is executed in the container runtime 450 on the computing node 110. Bundling the orchestrator logic 150 with the software application 134 can ensure that the programmable accelerator 140 is properly configured (e.g., with the correct configuration(s) and in the correct configuration sequence) for the software application 134 to work properly. Delegating the configuration to the orchestrator logic 150 (as opposed to the service framework) can also potentially enable the service scheduler 434 to be simpler as the service scheduler 434 can be relieved of tracking a status of the programmable accelerator 140.

The service scheduler 434 can be used to schedule services on the computing nodes 110 so that the services can be executed. The service scheduler 434 can determine a type, an amount, and an operational state of the different computing resources of the computing nodes 110. For example, the operational state can include an availability of the resources (e.g., whether a specific resource is configured or present on a computing node and how much/many of the resource(s) is/are available) and a utilization of the resources (e.g., whether a specific resource is idle or is being used at full or partial capacity). A scheduling policy can provide rules and/or preferences for scheduling the services. For example, the policy can specify how resources are selected (e.g., round-robin, priority-based, and so forth), when services can be deployed, and so forth. The service scheduler 434 can allocate services to computing nodes based on the number and types of services to execute, the scheduling policies, and the type, amount, and operational states of the different computing resources of the computing nodes 110.

As one example, the service scheduler 434 can schedule services based only on the of general-purpose resource requirements of a service and an availability of general-purpose resources. General-purpose resources are resources that are typically used for general-purpose computers. The general-purpose resources can include CPU or processor cores, memory, and storage volumes, for example. In contrast, the programmable accelerator 140 is a customizable resource that is different from the general-purpose resources because the hardware of the programmable accelerator 140 can be programmed to perform a user-defined function that can be changed when different services are executed on the computing node 110. As one example, the service scheduler 434 can exclude accounting for customizable resources (e.g., the programmable accelerator 140) when all of the computing nodes 110 include the same customizable resources.

As another example, the service scheduler 434 can also recognize and account for various attributes of the services and the resources of the computing nodes 110. For example, a service can include an attribute that must be matched or is preferred to be matched to a resource having a matching attribute. As a specific example, a particular service can be labeled with a "prog-hw-req" attribute indicating that the service requires a programmable accelerator resource. The service scheduler 434 can match a service having the "prog-hw-req" attribute to a computing node that also has the "prog-hw-req" attribute (indicating that the computing node includes a programmable accelerator). The scheduling policies can specify which attributes must be matched for a service to be scheduled and which attributes are preferred to be matched for a service to be scheduled, for example.

When the service scheduler 434 schedules a service to a computing node, the service scheduler 434 can update a mapping of which services are executing on which nodes of the computing nodes 110. The mapping can be stored in the workload and resource state. The mapping can be used to determine which computing nodes are being fully or partially utilized and which computing nodes are available to accept more services. The service scheduler 434 can also track the services pending to be executed on the computing nodes 110. The service scheduler 434 can analyze the operational state of the services and resources and update the workload and resource state. The service scheduler 434 can receive data associated with the computing-node level, the resource level, and the service level. For example, the service scheduler 434 can receive data from the computing nodes 110 indicating that new resources are available. New resources can become available when a computing node is added or reset, and an enumeration of the resources can be sent to the service scheduler 434 during an initialization sequence of the computing node. New resources can become available when a hardware accelerator is configured or reconfigured. The service scheduler 434 can decorate the workload and resource state with attributes that are representative of special-purpose hardware and functionality supported by a computing node. When the programmable accelerators are configured on a given computing node by the orchestrator logic 150, the service scheduler 434 can track the state of the computing node and potentially cause similar services (using the same accelerator) to be configured on the same computing node. The adaptive nature of the computing nodes can potentially enable more performant, secure, and/or available services compared to services that are scheduled on general-purpose non-adaptive computing nodes.

Each of the computing nodes 110 can host one or more services executing on the resources of the computing node. When the service scheduler 434 determines that a service is to be executed on one of the computing nodes 110, executable code for the service can be loaded into the memory 130 for execution by the container runtime 450 on the selected computing node 110. As one example, the executable code for the software application 134 and the orchestrator logic 150 can be sent from the management computer 410 to the computing node 110 and loaded by the container runtime 450 in conjunction with the OS 132. As another example, references to the software application 134 and the orchestrator logic 150 can be sent from the management computer 410 to the computing node 110, and the container runtime 150 can load the executable code for the routines into the memory 130 from the local storage 170 and/or remote storage.

The container runtime 450 can be used to deploy, monitor, and manage the execution of services executing on the computing node 110. The container runtime 450 can include hardware, software, or a combination of hardware and software. As one example, the container runtime 450 can be executable software code stored in the memory 130 and executed by the processor 120. The container runtime 450 can manage the services within the container runtime 450, such as by providing an executable environment for executing a service and by providing service and node management logic 460. Generally, the service and node management logic 460 can manage the compute, memory, storage, and networking resources of the computing node 110 that are available to the container runtime 450. For example, the service and node management logic 460 can include initialization or boot-up logic that can enumerate the resources of the computing node 110 and can store an inventory and/or a status of the resources in a data structure or file, such as a registry, stored in the memory 130 or the storage 170. Additionally or alternatively, the service and node management logic 460 can send information about the resources to the management computer 410. As a specific example, the service and node management logic 460 can update a database or registry to indicate that the computing node 110 includes the programmable accelerator 140.

The service and node management logic 460 can include logic for deploying a service on the computing node. For example, the service and node management logic 460 can start a process executing on the processor 120 and load the memory 130 with executable code of the service. The service and management logic 460 can supervise the usage of resources by the services and enforce resource usage policies, network policies and/or security policies of the container runtime 450. The container runtime 450 can provide an interface between a service executing in the container runtime 450 and the OS 132. The OS 132 can interface to the general-purpose computing resources (e.g., the processor 120, the memory 130, the storage 170, and the communication interface 190) and/or to the programmable accelerator 140.

As a specific example, the service scheduler 434 can determine that the service 440 is to be deployed on the computing node 110. The service scheduler 434 can communicate with the container runtime 450 so that the executable code for the service 440 is loaded into the memory 130. The service 440 can encapsulate the software application 134 and the orchestrator logic 150, and the container runtime 450 can encapsulate the service 440. When the service 440 is started, the orchestrator logic 150 can be used to orchestrate a configuration of the programmable accelerator 140 so that the programmable accelerator 140 can be used by the software application 134. For example, the orchestrator logic 150 can perform operations of the methods 200 and/or 300 as described with reference to FIGS. 2 and 3. Specifically, the orchestrator logic 150 can retrieve a system image (e.g., system image 162) by communicating with the file repository 160. The system image 162 can include configuration data (e.g., hardware configuration(s) for the configurable hardware 142 and firmware 144) for the programmable accelerator 140. The orchestrator logic 150 can be used to configure the programmable accelerator 140 to operate according to the configuration data of the retrieved system image 162. The orchestrator logic 150 can be used to enable an operating system module of the OS 132 to interoperate with the programmable accelerator 140. The orchestrator logic 150 can be used to enable the programmable accelerator 140, such as by setting an operational status bit within a control register of the programmable accelerator 140 and/or by notifying the software application 134 that the programmable accelerator 140 is ready for use. After the programmable accelerator 140 is initially configured to operate, the software application 134 and/or the management interface 154 can be used to provide additional programming for the programmable accelerator 140, such as by writing control registers of the programmable accelerator 140. The orchestrator logic 150 can also be used to reconfigure all or part of the programmable accelerator 140 concurrently with the programmable accelerator 140 processing data. As one example, an administrator or another user can use the management interface 154 to indicate that updated configuration data is available. Specifically, the updated configuration data can be available on the file repository 160 as a system image that can be loaded onto a configuration memory of the programmable accelerator 140 concurrently with the programmable accelerator 140 operating according to an earlier configuration. By packaging the software application 134 and orchestrator logic 150 together within a single service, the service 440 can be enabled to use both the general-purpose computing resources and the programmable accelerator 140 even when the service scheduler 434 only accounts for general-purpose resources of the computing nodes 110.

Figure 5:
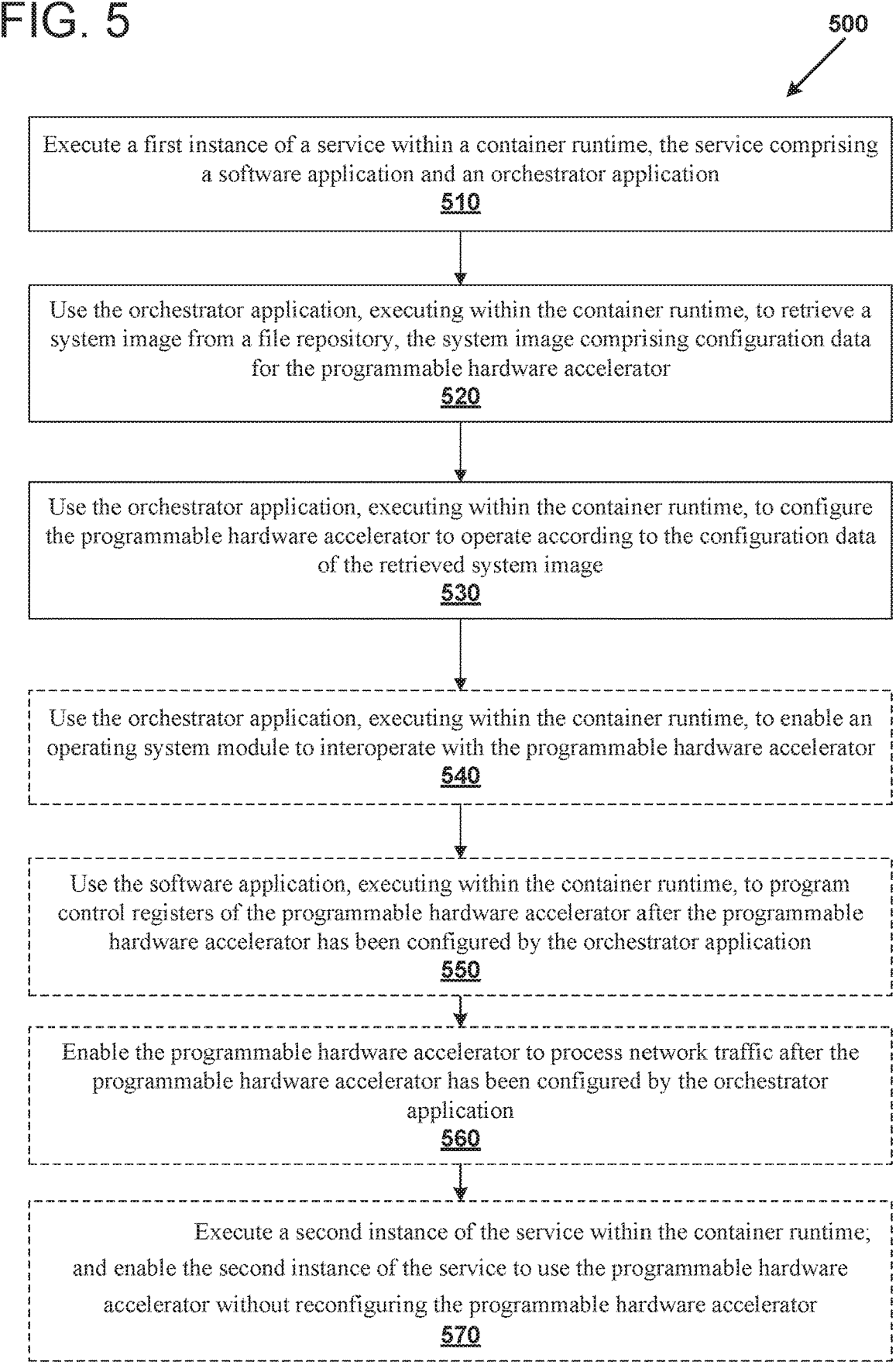
FIG. 5 is a flowchart of an example method for scheduling services and orchestrating a configuration of a programmable accelerator of a computing system.

FIG. 5 is a flowchart of an example method 500 for scheduling services and orchestrating a configuration of a programmable accelerator on a computing node of a cluster of computing nodes. For example, a service framework, such as described above with reference to FIG. 4, can be used to schedule services on the cluster of computing nodes. The service can include a software program and orchestrator logic. The orchestrator logic can be used to orchestrate a configuration of programmable hardware accelerator on a computing node so that the software program can access and use the configured programmable hardware accelerator. As one example, the method 500 can be implemented using the architecture 400, such as described above with reference to FIG. 4. For example, computer-executable instructions for carrying out the method 500 can be stored in computer-readable memory (e.g., the memory 130) and the instructions can be executed by one or more processor(s) (e.g., the processor(s) 120) to perform the method 500.

At 510, a first instance of a service can be executed within a container runtime. For example, the container runtime can be executing on a computing node (e.g., the computing node 110) within a cluster of computing nodes. The service can include a software application and an orchestrator application. The orchestrator application can be adapted to configure a programmable hardware accelerator (e.g., the programmable accelerator 140) and the software application can be adapted to interoperate with the programmable hardware accelerator that is configured by the orchestrator application. As one example, the orchestrator application can begin execution before the software application begins execution so that the programmable hardware accelerator can be configured prior to the software application accessing the programmable hardware accelerator. As another example, the software application can delay using the programmable hardware accelerator until the accelerator is configured by the orchestrator application. For example, the programmable hardware accelerator can modify control state that is visible to the software application, and the control state can indicate when the programmable hardware accelerator is ready for use. The software application can be a user-level application that uses the configurable hardware for processing data. As a specific example, the software application can be a network traffic manager that manages network traffic between a client application and a server application. For example, the software application can be used, in conjunction with the programmable hardware accelerator, to monitor network traffic, perform authentication and access functions for the server application, accelerate cryptographic operations, translate between a public network address and a private server computer address, perform load balancing functionality for the server application, and/or provide additional intermediary services for the server application.

At 520, the orchestrator application, executing within the container runtime, can be used to retrieve a system image from a file repository (such as the file repository 160). The system image can include configuration data for the programmable hardware accelerator. The configuration data can include one or more hardware configurations for programming the configurable hardware of the programmable hardware accelerator. For example, the configurable hardware can include multiple re-configurable regions and each hardware configuration can include configuration data for programming a particular re-configurable region. As one example, the base image can include configuration data for basic functionality of the programmable hardware accelerator that may be common for different hardware accelerators. For example, the basic functionality can include logic for implementing basic input and output functions, such as a communication protocol for an interconnect of the computing node. An application-specific image can include functionality that is used by the software application of the service.

At 530, the orchestrator application, executing within the container runtime, can be used to configure the programmable hardware accelerator to operate according to the configuration data of the retrieved system image. Specifically, the orchestrator application can apply the configuration data from the retrieved system image. Applying the configuration data can include writing directly or indirectly (such as by using a configuration port of the configurable logic) to a configuration memory of the programmable hardware accelerator. The loading of the configuration memory can occur concurrently with the configurable logic operating according to a different configuration data. The data stored on the configuration memory can then be loaded to the control logic of the configurable logic so that the programmable hardware accelerator will operate according to the configuration data.

At optional 540, the orchestrator application, executing within the container runtime, can be used to enable an operating system module to interoperate with the programmable hardware accelerator. The operating system module can include kernel modules and/or drivers of the operating system. For example, a driver can be used as an interface between a hardware resource and the operating system. As a specific example, the operating system module can be an SR-IOV driver.

At optional 550, the software application, executing within the container runtime, can be used to program control registers of the programmable hardware accelerator after the programmable hardware accelerator has been configured by the orchestrator application. For example, the control registers of the programmable hardware accelerator can be programmed during a runtime of the programmable hardware accelerator. The control registers can be used to monitor and/or change a functionality of the programmable hardware accelerator without changing the hardware configuration of the configurable logic. In other words, the control registers can enable software control of some aspects of the programmable hardware accelerator functionality.

At optional 560, the programmable hardware accelerator can be enabled to process network traffic after the programmable hardware accelerator has been configured by the orchestrator application. As one example, all or a portion of the programmable hardware accelerator can be reset to begin operation. As another example, the programmable hardware accelerator can be set to an operational state using a control register of the accelerator. As another example, a data path between a source of incoming data (such as a high-speed network interface) and the programmable hardware accelerator can be enabled.

At optional 570, a second instance of the service can be executed within the container runtime and the second instance of the service can be enabled to use the programmable hardware accelerator without reconfiguring the programmable hardware accelerator. Specifically, the orchestrator application of the second instance, executing within the container runtime, can be used to determine the programmable hardware accelerator is already configured to operate according to the configuration data of the retrieved system image. In response to determining the programmable hardware accelerator is already configured, the second instance of the service can be enabled to use the programmable hardware accelerator without reconfiguring the programmable hardware accelerator. Accordingly, the first instance of the service and the second instance of the service can share the configured programmable hardware accelerator.

Figure 6:
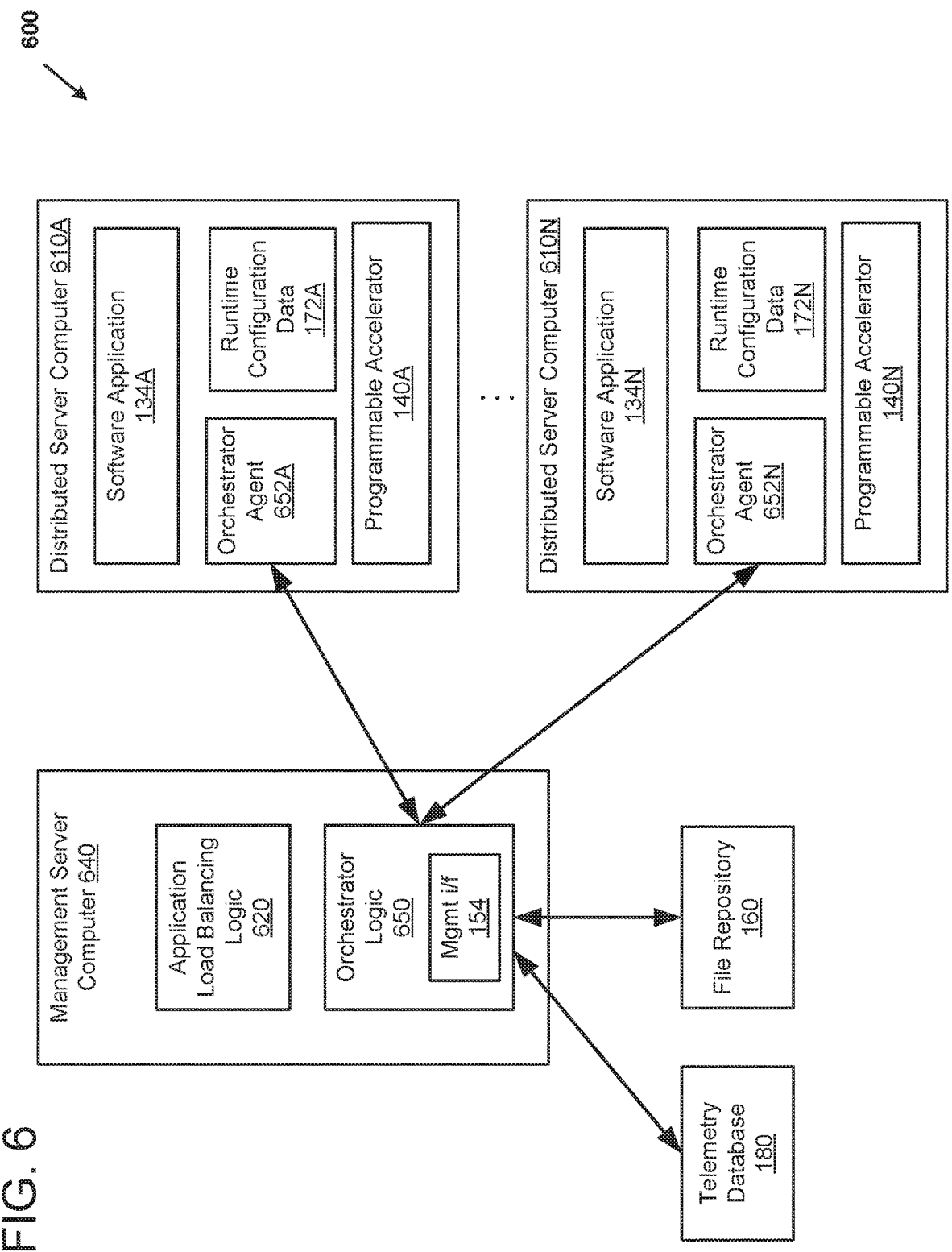
FIG. 6 is a block diagram of an example architecture implementing a software-as-a-service on a distributed computing system including orchestrator logic for configuring a programmable accelerator.

Examples of Orchestrating a Configuration of a Programmable Accelerator on a Computing Node within a Software-as-a-Service Environment FIG. 6 is a block diagram of an example architecture 600 implementing a software-as-a-service on a distributed computing system including orchestrator logic for configuring a programmable accelerator. A provider of a software-as-a-service may host a software application at a datacenter and allow tenants (e.g., customers) to access the software using a network connection. A software-as-a-service architecture can be scalable to serve a varying number of tenants having a varying number of workloads. For example, the architecture 600 for implementing a software-as-a-service can host the software application 134 at multiple distributed server computers 610A-N. The number of server computers can be varied according to a load that may be proportional to the number of tenants, and an amount of the tenant usage of the software application 134. The server computers 610A-N that execute the software application 134 can be controlled using a management server computer 640. For example, the management server computer 640 can include application load balancing logic 620 which can monitor usage of the software application 134 and determine when additional server computers executing the software application 134 are to be deployed and/or torn down. Adjusting the number of distributed server computers executing the software application 134 can be orchestrated using the centralized orchestrator logic 650 and the orchestrator agents 652A-N. The combination of the centralized orchestrator logic 650 and the orchestrator agents 652A-N can perform operations of the orchestrator 150, as described above with reference to FIGS. 1-5, in the context of a distributed software-as-a-service architecture.

As one example, the application load balancing logic 620 can determine that a new distributed server computer 610 is to be brought online to host the software application 134 for tenants of the service. The application load balancing logic 620 can communicate that a new server is to be added to the orchestrator logic 650. The orchestrator logic 650 retrieve a system image from the file repository 160 and send the system image to the orchestrator agent 652 on the selected server computer 610. The orchestrator agent 652 can communicate with the programmable accelerator 140 and because the configuration data from the system image to be loaded onto the programmable accelerator 140. The orchestrator logic 650 can identify operating system modules and/or drivers that are to be enabled and/or installed on the server computer 110 and can communicate that information to the orchestrator agent 652. The orchestrator agent 652 can cause the operating system modules and/or drivers to be enabled and/or installed on the server computer 110. The orchestrator agent 652 can enable the programmable accelerator 140 so that the software application 134 can use the programmable accelerator 140. Additional configuration data applied to the programmable accelerator 140 (such as by the software application 134 or via the management interface 154), while the programmable accelerator 140 is operational, can be stored locally in the runtime configuration data 172 as well as in the telemetry database 180. The runtime configuration data 172 can be used when changing versions of the configuration of the programmable accelerator 140 (e.g., upgrading or downgrading). Environmental and operational data of the distributed server 610 can be captured by the orchestrator agent 652, passed to the orchestrator logic 650, and sent to the telemetry database 180 for storage. The telemetry database 180 can also include inventory and configurations of the distributed server computers 610.

Example Computing Environments

Figure 7:
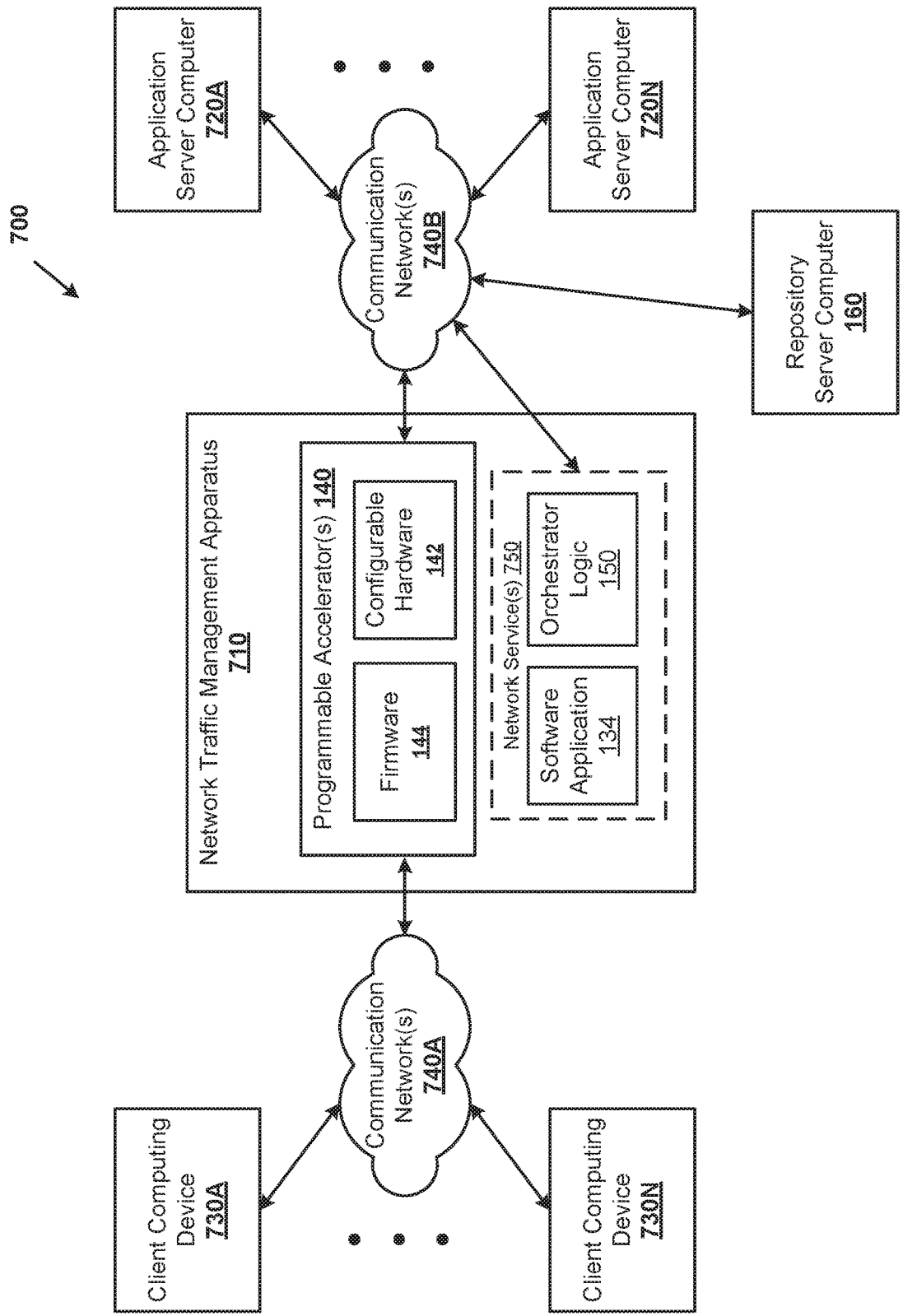
FIG. 7 is a block diagram of an example client-server architecture including a network traffic management apparatus implementing a method for orchestrating the configuration of a programmable accelerator.

FIG. 7 illustrates an example client-server architecture 700 (also referred to as a network traffic management system) that incorporates a network traffic management apparatus 710. The client-server architecture 700 includes a network traffic management apparatus 710 that is coupled to one or more server computers (such as server computers 720A-N) and one or more client devices (such as client computing devices 730A-N) via one or more communication networks (such as the communication networks 740A and 740B). The server computers 720A-N can communicate with one or more additional server computer(s) that are accessible via the communication networks 740A. As one example, the communication network 740A can include a public network (e.g., the Internet) and devices attached to the network 740A can be accessed using public network addresses; the communication network 740B can include a private network and devices attached to the network 740B can be accessed using private network addresses.

The communication networks 740A-B can include various wired and/or wireless communication technologies, such as a local area network (LAN), a wide area network (WAN), an intranet, the Internet, a public switched telephone network (PSTN), and so forth. The devices connected to the communication networks 740A-B can communicate with each other using various communications protocols, such as transmission control protocol with Internet protocol (TCP/IP) over Ethernet and/or other customized or industry-standard protocols. The communication protocols can be used to transmit information over the networks 740A-B using packet-based messages (e.g., Ethernet-based packet data networks) and/or other application programming interfaces (APIs). An API is a programmatic interface (e.g., a set of methods and/or protocols) for communicating among different modules. The communication networks 740A-B can include various network devices, such as switches (multilayer or single-layer), routers, repeaters, gateways, network bridges, hubs, protocol converters, bridge routers, proxy servers, firewalls, network address translators, multiplexers, network interface controllers, wireless network interface controllers, modems, line drivers, and wireless access points, for example. As illustrated, the network traffic management apparatus 710 is positioned in-line between the client computing devices 730A-N and the server computers 720A-N so that the network traffic management apparatus 710 can intercept all network traffic flowing between the different networks 740A and 740B. In other examples, the network traffic management apparatus 710, the server computer 720A-N, and the client devices 730A-N can be coupled together via other topologies. As one specific example, the server computers 720A-N can be integrated within the network traffic management system 700 (e.g., server computer functions can be implemented in software within one or more devices of the network traffic management apparatus 710). It should be appreciated by one of ordinary skill in the art having the benefit of the present disclosure, that the network topology illustrated in FIG. 7 has been simplified and that multiple networks and networking devices can be utilized to interconnect the various computing systems disclosed herein. Additionally, one or more of the devices of the client-server architecture 700 in these examples can be in a same or a different communication network including one or more public, private, or cloud networks, for example.

Figure 8:
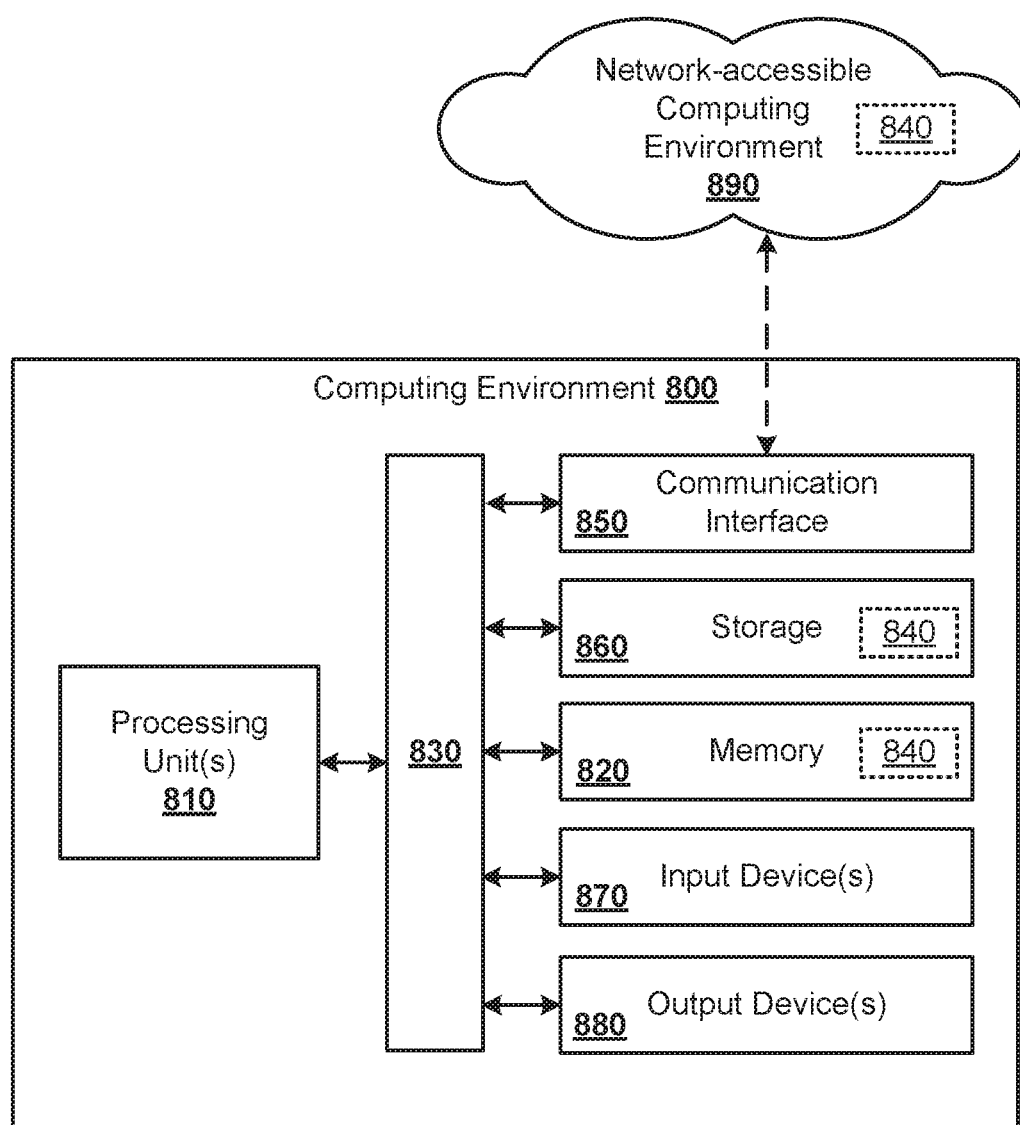
FIG. 8 is a block diagram of an example computing environment, such as can be used for a server computer.

Generally, the server computers 720A-N, the client devices 730A-N, and the network traffic management system 700 can perform various computing tasks that are implemented using a computing environment, such as the computing environment described in more detail with respect to FIG. 8. The computing environment can include computer hardware, computer software, and combinations thereof. As a specific example, the computing environment can include general-purpose and/or special-purpose processor(s), configurable and/or hard-wired electronic circuitry, a communications interface, and computer-readable memory for storing computer-executable instructions to enable the processor(s) to perform a given computing task. The logic to perform a given task can be specified within a single module or interspersed among multiple modules. As used herein, the terms "module" and "component" can refer to an implementation within one or more dedicated hardware devices or apparatus (e.g., computer(s)), and/or an implementation within software hosted by one or more hardware devices or apparatus that may be hosting one or more other software applications or implementations.

The client devices 730A-N can include any type of computing device that can exchange network data, such as mobile communication devices, laptop computers, desktop computers, tablet computers, virtual machines executing within a cloud-computer-based environment, and so forth. The client devices 730A-N can run interface applications, such as web browsers or standalone client applications, which may provide an interface to communicate with (e.g., make requests for, and receive content stored on) one or more of the server computers 720A-N via the communication network(s) 740A and 740B. The client devices 730A-N can further include an output device (such as a display screen or touchscreen (not illustrated)) and/or an input device (such as a keyboard (not illustrated)). Additionally, one or more of the client devices 730A-N can be configured to execute software code (e.g., JavaScript code within a web browser) in order to log client-side data and provide the logged data to the network traffic management apparatus 710 or the server computers 720A-N.

The server computers 720A-N can include any type of computing device that can exchange network data. For example, the server computers 720A-N can exchange network data with the client devices 730A-N and with each other. As another example, the server computers 720A-N can exchange communications along communication paths specified by application logic in order to facilitate a client-server application interacting with the client devices 730A-N. Examples of the server computers 720A-N can include application servers, database servers, access control servers, and encryption servers. Accordingly, in some examples, one or more of the server computers 720A-N process login and other requests received from the client devices 730A-N via the communication network(s) 740A and 740B according to the Hypertext Transfer Protocol (HTTP) or Hypertext Transfer Protocol Secure (HTTPS) application-layer protocol. A web application may be operating on one or more of the server computers 720A-N and transmitting data (e.g., files or web pages) to the client devices 730A-N (e.g., via the network traffic management apparatus 710) in response to requests from the client devices 730A-N. The server computers 720A-N can be hardware and/or software and may represent a system with multiple servers in a pool, which may include internal or external networks.

While the server computers 720A-N are illustrated as single devices, one or more actions of each of the server computers 720A-N may be distributed across one or more distinct network computing devices that together comprise one or more of the server computers 720A-N. Moreover, the server computers 720A-N are not limited to a particular configuration. Thus, the server computers 720A-N may contain network computing devices that operate using a coordinated approach, whereby one of the network computing devices of the server computers 720A-N operate to manage or otherwise coordinate operations of the other network computing devices. Each of the server computers 720A-N can operate as a networked computing device within a cluster architecture, a computing device within a peer-to peer architecture, a virtual machine, or a resource within a cloud-based computer architecture, for example. Thus, the technology disclosed herein is not to be construed as being limited to a single environment and other configurations and architectures are also envisaged. For example, one or more of the server computers 720A-N can operate within the network traffic management apparatus 710 itself rather than as a stand-alone server device communicating with the network traffic management apparatus 710 via communication network 740B. In this example, the one or more of the server computers 720A-N operate within the memory of the network traffic management apparatus 710.

The network traffic management apparatus 710 can include any type of computing device that can be used for managing network traffic. The network traffic management apparatus 710 can perform a number of functions, including providing network security, access control, load balancing network traffic across the server computers 720A-N, and/or accelerating network traffic associated with an application hosted by one or more of the server computers 720A-N, for example. Network service(s) 750 can be used to perform some or all of the functions of the network traffic management apparatus 710. For example, the service(s) can perform proxy and other services on behalf of the server 720A-N and manage traffic between the clients 730A-N and the servers 720A-N. Additionally, the network traffic management apparatus 710 can include other network devices such as one or more routers or switches, for example.

Functions of the network traffic management system 700 can be accelerated by the programmable accelerator(s) 140. For example, the network service 750 can include a software application 134 and the orchestrator logic 150. The orchestrator logic 150 can orchestrate configuration of the programmable accelerator 140, such as illustrated above with reference to FIGS. 1-6. For example, the orchestrator logic 150 can retrieve a system image from the repository server computer 160. The system image can include configuration data for programming the programmable accelerator 140. The orchestrator logic 150 can cause the programmable accelerator 140 to be programmed with the configuration data, such as by applying a hardware configuration to the configurable hardware 142 and programming the firmware 144 for adding additional functionality to the programmable accelerator 140. The orchestrator logic 150 can enable and/or install operating system modules on the network traffic management apparatus 710. The orchestrator logic 150 can coordinate with the software application 134 to enable the programmable accelerator 140 and the network traffic management apparatus 710 to begin processing the network traffic between the client computing devices 730A-N and the application server computers 720A-N.

While the network traffic management apparatus 710 is illustrated in this example as including a single device, the network traffic management apparatus 710 in other examples can include a plurality of devices or blades each having one or more processors (each processor with one or more processing cores) that implement one or more components of this technology. In these examples, one or more of the devices can have a dedicated communication interface or memory. Alternatively, one or more of the devices can utilize the memory, communication interface, or other hardware or software components of one or more other devices included in the network traffic management apparatus 710. Additionally, the network traffic management apparatus 710 and/or the application(s) executed by the network traffic management apparatus 710 can be operative in a cloud-based computing environment. The application(s) can be executed within or as virtual machine(s) or virtual server(s)

that can be managed in a cloud-based computing environment. For example, the application(s), and even the network traffic management apparatus 710 itself, can be located in virtual server(s) running in a cloud-based computing environment rather than being tied to one or more specific physical network computing devices. Also, the application(s) can be running in one or more virtual machines (VMs) executing on the network traffic management apparatus 710. Additionally, in one or more examples of this technology, virtual machine(s) running on the network traffic management apparatus 710 can be managed or supervised by a hypervisor. Additionally, one or more of the components that together comprise the network traffic management apparatus 710 can be standalone devices or integrated with one or more other devices or apparatuses, such as with one or more of the server computers 720A-N, for example.

Additionally, one or more of the components depicted in the client-server architecture 700, such as the network traffic management apparatus 710, server computers 720A-N, or client computing devices 730A-N, for example, may be configured to operate as virtual instances on the same physical machine. In other words, one or more of the network traffic management apparatus 710, server computers 720A-N, or client computing devices 730A-N may operate on the same physical device rather than as separate devices communicating through communication networks 740A and 740B. Additionally, there may be more or fewer network traffic management apparatuses, client computing devices, or server computers than illustrated in FIG. 7.

FIG. 8 illustrates a block diagram of a generalized example of a suitable computing environment 800 that can be used to implement the examples, techniques, and technologies described herein. For example, the computing environment 800 can be used to implement a network traffic management apparatus including an intermediary server that performs the disclosed techniques for orchestrating configuration of a programmable accelerator.

The computing environment 800 includes at least one processing unit 810 and computer-readable memory 820, which are coupled together by an interconnect 830. The processing unit 810 executes computer-executable instructions. The processing unit 810 can include a general-purpose processor, a special-purpose processor, and combinations thereof. For example, the processing unit 810 can include a general-purpose central processing unit (CPU), a graphics processor, a processor in an application-specific integrated circuit (ASIC), a processor configured to operate using programmable logic (such as in a field-programmable gate array (FPGA)), and/or any other type of processor. In a multi-processing system, multiple processing units can be used to execute computer-executable instructions to increase processing power.

The memory 820 stores software 840 implementing one or more innovations described herein, in the form of computer-executable instructions suitable for execution by the processing unit 810. Specifically, the memory 820 can be used to store computer-executable instructions, data structures, input data, output data, and other information. The memory 820 can include volatile memory (e.g., registers, cache, random-access memory (RAM)), non-volatile memory (e.g., read-only memory (ROM), electrically-erasable programmable ROM (EEPROM), and flash memory), and/or combinations thereof. The memory 820 can include operating system software (not illustrated). Operating system software can provide an operating environment for other software executing in the computing environment 800 and can coordinate activities of the components of the computing environment 800.

The interconnect 830 is used to connect different components of the computing environment 800 together so that the processing unit 810 can communicate with the different components and/or so that the different components can communicate with each other. For example, the interconnect 830 can include a bus, controller, and/or a network. As one example, the interconnect 830 can include a host bridge (also referred to as a northbridge) for connecting the processing unit 810 to relatively high-speed components (such as the memory 820) and an input/output bridge (also referred to as a southbridge) for connecting to relatively lower-speed components (such as a communications interface 850) within the computing environment 800. In some examples, one or more components of the computing environment 800 can be integrated within or connected directly to the processing unit 810.

The computing environment 800 can include a communication interface 850 for communicating with another computing entity using a communication medium (e.g., a physical layer). The communication interface 850 can implement all or a portion of a network protocol stack. The network protocol stack defines communication formats and rules for communicating between different devices connected to a network. For example, the network protocol stack can define modular layers for communication using the Open Systems Interconnection (OSI) model or another model. The OSI model standardizes and partitions a communication system into seven layers including a physical layer (referred to as layer 1) and an application layer (referred to as layer 7). The application layer can be used to define how applications access the communications subsystem. The physical layer defines the electrical and physical specifications for communication over a communication medium (also referred to as a physical transmission medium). The communication medium can be used to convey information, such as computer-executable instructions or other data, in a modulated data signal. A modulated data signal is a signal that has one or more of its characteristics adjusted in such a manner as to encode information in the signal. The communication interface 850 can include electronic and/or optical circuitry to receive and transmit communications signals that are encoded (e.g., according to a physical layer specification of the network stack) using an electrical, optical, radio-frequency (RF), or another carrier signal. Accordingly, the communication interface 850 can be used to communicate over wired connections (e.g., twisted-wire pair, coaxial cable, and fiber optic connections) and/or wireless technologies (e.g., Bluetooth, WiFi (IEEE 802.11), and cellular). As a specific example with reference to FIG. 7, a communication interface of the network traffic management apparatus 710 operatively couples to and communicates with the communication networks 740A and 740B so that the network traffic management apparatus 710 is coupled to and can communicate with the server computers 720A-N and the client computing devices 730A-N.

The computing environment 800 can include storage 860 that is used to store instructions for the software 840, data structures, and data, which can be used to implement the technologies described herein. The storage 860 can include electronic circuitry for reading and/or writing to removable or non-removable storage media using magnetic, optical, or other reading and writing system that is coupled to the processor. The storage 860 can include read-only storage media and/or readable and writeable storage media, such as magnetic disks, solid state drives, magnetic tapes or cassettes, CD-ROMs, CD-RWs, DVDs, or any other medium which can be used to store information and that can be accessed within the computing environment 800.

The computing environment 800 can include input device(s) 870. For example, the input device(s) 870 can provide an input interface to a user of the computing environment 800 and/or to receive inputs from a physical environment. The input device(s) 870 can include a tactile input device (e.g., a keyboard, a mouse, or a touchscreen), a microphone, a camera, a sensor, or another device that provides input to the computing environment 800.

The computing environment 800 can include output device(s) 880. For example, the output device(s) 880 can provide an output interface to a user of the computing environment 800 and/or to generate an output observable in a physical environment. The output device(s) 880 can include a light-emitting diode, a display, a printer, a speaker, a CD-writer, or another device that provides output from the computing environment 800. In some examples, the input device(s) 870 and the output device(s) 880 can be used together to provide a user interface to a user of the computing environment 800.

The computing environment 800 is not intended to suggest limitations as to scope of use or functionality of the technology, as the technology can be implemented in diverse general-purpose and/or special-purpose computing environments. For example, the disclosed technology can be practiced in a local, distributed, and/or network-enabled computing environment. In distributed computing environments, tasks are performed by multiple processing devices. Accordingly, principles and advantages of distributed processing, such as redundancy, parallelization, and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof. As a specific example, a distributed computing environment can include the processing unit 810 and the network-accessible computing environment 890 that is linked through a communications network. In a distributed computing environment, program modules 840 (including executable instructions for orchestrating configuration of a programmable accelerator) can be located in both local and remote memory storage devices.

The term computer-readable media includes non-transient media for data storage, such as memory 820 and storage 860, and does not include transmission media such as modulated data signals and carrier waves. Any of the disclosed methods can be implemented as computer-executable instructions stored on one or more computer-readable media and executed on a computer (e.g., any commercially available computer). Any of the computer-executable instructions for implementing the disclosed techniques as well as any data structures and data created and used during implementation of the disclosed embodiments can be stored on one or more computer-readable storage media. For example, the computer-executable instructions can be part of a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, or other such network) using one or more network-attached computers.

This disclosure is set forth in the context of representative examples that are not intended to be limiting. Accordingly, this disclosure is directed toward all novel and non-obvious features and aspects of the various disclosed examples, alone and in various combinations and sub-combinations with one another. Many variations of the specific hardware and software used to implement the examples are possible, as will be appreciated by those skilled in the relevant art with the benefit of this disclosure. The disclosed systems, methods, and apparatus are not limited to any specific aspect or feature or combinations thereof, nor does the disclosed technology require that any one or more specific advantages be present or problems be solved. Theories of operation, scientific principles, or other theoretical descriptions presented herein in reference to the disclosed technology have been provided for the purposes of better understanding and are not intended to be limiting in scope. The apparatus and methods in the appended claims are not limited to those apparatus and methods that function in the manner described by such theories of operation.

As used in this application the singular forms "a," "an," and "the" include the plural forms unless the context clearly dictates otherwise. The term "coupled" encompasses mechanical, electrical, magnetic, optical, as well as other practical ways of coupling or linking items together, and does not exclude the presence of intermediate elements between the coupled items. The term "and/or" means any one item or combination of items in the phrase.

The recited order of processing elements or sequences, or the use of numbers, letters, or other designations therefore, is not intended to limit the claimed processes to any order. Although the operations of some of the disclosed methods are described in a particular, sequential order for convenient presentation, it should be understood that this manner of description encompasses rearrangement, unless a particular ordering is required by specific claim language set forth below. For example, operations described sequentially may in some cases be rearranged or performed concurrently. Moreover, for the sake of simplicity, the attached figures may not show all of the various ways in which the disclosed methods can be used in conjunction with other methods.

It should also be well understood that any software functionality described herein can be performed, at least in part, by one or more hardware logic components, instead of software. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so forth.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Having thus described many possible embodiments to which the principles of the invention may be applied, it will be recognized by those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the scope of the claimed subject matter is defined by the following claims. We therefore claim as our invention all that comes within the scope of these claims.

What is claimed is:

1. A method implemented by a network traffic management system comprising one or more network traffic management apparatuses, server devices, or client devices, the method comprising:

executing a first instance of a service within a container runtime, the service comprising a software application and an orchestrator application, the orchestrator application adapted to configure a programmable hardware accelerator, the software application adapted to interoperate with the programmable hardware accelerator that is configured by the orchestrator application;

using the orchestrator application, executing within the container runtime, to retrieve a system image from a file repository, the system image comprising configuration data for the programmable hardware accelerator, the configuration data comprising basic functionality that comprises logic for implementing input and output functions of the programmable hardware accelerator;

using the orchestrator application, executing within the container runtime, to configure the programmable hardware accelerator to operate according to the configuration data of the retrieved system image; and using the software application, executing within the container runtime, to program control registers of the programmable hardware accelerator after the programmable hardware accelerator has been configured by the orchestrator application, the control registers comprising of changing a functionality of the programmable hardware accelerator without changing hardware configurations.

2. The method of claim 1, further comprising:
using the orchestrator application, executing within the container runtime, to enable an operating system module to interoperate with the programmable hardware accelerator.

3. The method of claim 1, further comprising:
enabling the programmable hardware accelerator to process network traffic after the programmable hardware accelerator has been configured by the orchestrator application.

4. The method of claim 1, further comprising:
executing a second instance of the service within the container runtime;
using the orchestrator application of the second instance, executing within the container runtime, to determine the programmable hardware accelerator is already configured to operate according to the configuration data of the retrieved system image; and
in response to determining the programmable hardware accelerator is already configured, enabling the second instance of the service to use the programmable hardware accelerator without reconfiguring the programmable hardware accelerator.

5. A system comprising one or more network traffic management modules, networking modules, or server modules, memory comprising programmed instructions stored thereon, and one or more processors configured to be capable of executing the stored programmed instructions to:

execute a first instance of a service within a container runtime, the service comprising a software application and an orchestrator application, the orchestrator application adapted to configure a programmable hardware accelerator, the software application adapted to interoperate with the programmable hardware accelerator that is configured by the orchestrator application;

use the orchestrator application, executing within the container runtime, to retrieve a system image from a file repository, the system image comprising configuration data for the programmable hardware accelerator, the configuration data comprising a basic functionality that comprises logic for implementing input and output functions of the programmable hardware accelerator;

use the orchestrator application, executing within the container runtime, to configure the programmable hardware accelerator to operate according to the configuration data of the retrieved system image; and use the software application, executing within the container runtime, to program control registers of the programmable hardware accelerator after the programmable hardware accelerator has been configured by the orchestrator application, the control registers comprising of changing a functionality of the programmable hardware accelerator without changing hardware configurations.

6. The system of claim 5, wherein the one or more processors are further configured to be capable of executing the stored programmed instructions to:
use the orchestrator application, executing within the container runtime, to enable an operating system module to interoperate with the programmable hardware accelerator.

7. The system of claim 5, wherein the one or more processors are further configured to be capable of executing the stored programmed instructions to:
enable the programmable hardware accelerator to process network traffic after the programmable hardware accelerator has been configured by the orchestrator application.

8. The system of claim 5, wherein the one or more processors are further configured to be capable of executing the stored programmed instructions to:
execute a second instance of the service within the container runtime;
use the orchestrator application of the second instance, executing within the container runtime, to determine the programmable hardware accelerator is already configured to operate according to the configuration data of the retrieved system image; and
in response to determining the programmable hardware accelerator is already configured, enable the second instance of the service to use the programmable hardware accelerator without reconfiguring the programmable hardware accelerator.

9. A non-transitory computer readable medium having stored thereon instructions comprising executable code that, when executed by one or more processors, causes the processors to:
execute a first instance of a service within a container runtime, the service comprising a software application and an orchestrator application, the orchestrator application adapted to configure a programmable hardware accelerator, the software application adapted to interoperate with the programmable hardware accelerator that is configured by the orchestrator application;

use the orchestrator application, executing within the container runtime, to retrieve a system image from a file repository, the system image comprising configuration data for the programmable hardware accelerator, the configuration data comprising a basic functionality that comprises logic for implementing input and output functions of the programmable hardware accelerator;

use the orchestrator application, executing within the container runtime, to configure the programmable hardware accelerator to operate according to the configuration data of the retrieved system image; and use the software application, executing within the container runtime, to program control registers of the programmable hardware accelerator after the programmable hardware accelerator has been configured by the orchestrator application, the control registers comprising of changing a functionality of the programmable hardware accelerator without changing hardware configurations.

10. The non-transitory computer readable medium of claim 9, wherein the instructions further comprise executable code that, when executed by one or more processors, causes the processors to:

use the orchestrator application, executing within the container runtime, to enable an operating system module to interoperate with the programmable hardware accelerator.

11. The non-transitory computer readable medium of claim 9, wherein the instructions further comprise executable code that, when executed by one or more processors, causes the processors to:

enable the programmable hardware accelerator to process network traffic after the programmable hardware accelerator has been configured by the orchestrator application.

12. The non-transitory computer readable medium of claim 9, wherein the instructions further comprise executable code that, when executed by one or more processors, causes the processors to:

execute a second instance of the service within the container runtime;

use the orchestrator application of the second instance, executing within the container runtime, to determine the programmable hardware accelerator is already configured to operate according to the configuration data of the retrieved system image; and in response to determining the programmable hardware accelerator is already configured, enable the second instance of the service to use the programmable hardware accelerator without reconfiguring the programmable hardware accelerator.

13. A network traffic management apparatus, comprising memory comprising programmed instructions stored thereon and one or more processors configured to be capable of executing the stored programmed instructions to:

execute a first instance of a service within a container runtime, the service comprising a software application and an orchestrator application, the orchestrator application adapted to configure a programmable hardware accelerator, the software application adapted to interoperate with the programmable hardware accelerator that is configured by the orchestrator application;

use the orchestrator application, executing within the container runtime, to retrieve a system image from a file repository, the system image comprising configuration data for the programmable hardware accelerator, the configuration data comprising a basic functionality that comprises logic for implementing input and output functions of the programmable hardware accelerator;

use the orchestrator application, executing within the container runtime, to configure the programmable hardware accelerator to operate according to the configuration data of the retrieved system image; and use the software application, executing within the container runtime, to program control registers of the programmable hardware accelerator after the programmable hardware accelerator has been configured by the orchestrator application, the control registers comprising of changing a functionality of the programmable hardware accelerator without changing hardware configurations.

14. The network traffic management apparatus of claim 13, wherein the one or more processors are further configured to be capable of executing the stored programmed instructions to:

use the orchestrator application, executing within the container runtime, to enable an operating system module to interoperate with the programmable hardware accelerator.

15. The network traffic management apparatus of claim 13, wherein the one or more processors are further configured to be capable of executing the stored programmed instructions to:

enable the programmable hardware accelerator to process network traffic after the programmable hardware accelerator has been configured by the orchestrator application.

16. The network traffic management apparatus of claim 13, wherein the one or more processors are further configured to be capable of executing the stored programmed instructions to:

execute a second instance of the service within the container runtime;

use the orchestrator application of the second instance, executing within the container runtime, to determine the programmable hardware accelerator is already configured to operate according to the configuration data of the retrieved system image; and in response to determining the programmable hardware accelerator is already configured, enable the second instance of the service to use the programmable hardware accelerator without reconfiguring the programmable hardware accelerator.

* * * * *